(12) United States Patent
Nomura et al.

(10) Patent No.: US 7,639,285 B2
(45) Date of Patent: Dec. 29, 2009

(54) FLICKER REDUCTION METHOD, FLICKER REDUCTION CIRCUIT AND IMAGE PICKUP APPARATUS

(75) Inventors: Hirofumi Nomura, Saitama (JP); Masahiro Ito, Kanagawa (JP)

(73) Assignee: Sony Corporation, Tokyo (JP)

( * ) Notice: Subject to any disclaimer, the term of this patent is extended or adjusted under 35 U.S.C. 154(b) by 517 days.

(21) Appl. No.: 11/516,775

(22) Filed: Sep. 7, 2006

(65) Prior Publication Data

US 2007/0052816 A1 Mar. 8, 2007

(30) Foreign Application Priority Data

Sep. 8, 2005 (JP) ............... 2005-261095

(51) Int. Cl.
 *H04N 9/73* (2006.01)
(52) U.S. Cl. ............... 348/228.1; 348/241; 348/296; 348/302
(58) Field of Classification Search ........... 348/226.1, 348/227.1, 228.1, 296, 297, 302, 362, 364, 348/365, 367, 607, 241; 352/201, 229; 382/274
 See application file for complete search history.

(56) References Cited

U.S. PATENT DOCUMENTS

| | | | | |
|---|---|---|---|---|
| 5,384,595 A | * | 1/1995 | Sakaguchi | 348/208.99 |
| 6,573,933 B1 | * | 6/2003 | Takayama | 348/226.1 |
| 6,657,659 B1 | * | 12/2003 | Van Rooy et al. | 348/226.1 |
| 6,710,818 B1 | | 3/2004 | Kasahara et al. | |
| 7,034,870 B2 | * | 4/2006 | Nagaoka et al. | 348/228.1 |
| 2004/0165084 A1 | * | 8/2004 | Yamamoto et al. | 348/226.1 |
| 2005/0046704 A1 | | 3/2005 | Kinoshita | |
| 2005/0093996 A1 | | 5/2005 | Kinoshita | |
| 2005/0157203 A1 | * | 7/2005 | Nakakuki et al. | 348/362 |
| 2005/0264663 A1 | | 12/2005 | Sato | |
| 2006/0055823 A1 | | 3/2006 | Kinoshita et al. | |
| 2006/0061669 A1 | * | 3/2006 | Jang et al. | 348/226.1 |
| 2007/0146500 A1 | * | 6/2007 | Lee et al. | 348/226.1 |

FOREIGN PATENT DOCUMENTS

| | | |
|---|---|---|
| JP | 2001-119708 | 4/2001 |
| JP | 2004-33616 | 2/2004 |
| JP | 2004-222228 | 8/2004 |
| JP | 2005-64973 | 3/2005 |
| JP | 2005-86423 | 3/2005 |
| JP | 2005-247939 | 12/2005 |
| JP | 2005-333327 | 12/2005 |
| WO | WO 2005/120047 A1 | 12/2005 |

* cited by examiner

*Primary Examiner*—Lin Ye
*Assistant Examiner*—Chriss S Yoder, III
(74) *Attorney, Agent, or Firm*—Finnegan, Henderson, Farabow, Garrett & Dunner, L.L.P.

(57) ABSTRACT

It is now possible to correct flicker without the risk of correcting flicker by error if a moving subject exists in the scene by using values detected in the past in order to prevent degradation of image quality from taking place. The integral value obtained by integrating an input video signal that includes a flicker component over not less than a horizontal period and the difference value between integral values of adjacent fields or frames is normalized. Then, the amplitude component and the phase component of the flicker component are estimated. A flicker coefficient for canceling the amplitude component and the phase component of the flicker component estimated is generated on the basis of the probability of being under the lighting of a fluorescent lamp. The flicker coefficient and the input video signal are computationally determined to obtain a video signal with a reduced flicker component.

17 Claims, 18 Drawing Sheets

FLICKER REDUCTION METHOD, FLICKER REDUCTION CIRCUIT AND IMAGE PICKUP APPARATUS

CROSS REFERENCES TO RELATED APPLICATIONS

The present invention contains subject matter related to Japanese Patent Application JP 2005-261095 filed in the Japanese Patent Office on Sep. 8, 2005, the entire contents of which being incorporated herein by reference.

BACKGROUND OF THE INVENTION

1. Field of the Invention

The present invention relates to a flicker-reduction method and a flicker-reduction circuit to be used for an image pickup apparatus such as a video camera or a digital still camera including an XY address scanning type imaging element (imager, image sensor), which may typically be a CMOS (complementary metal oxide semiconductor) imaging element, under the lighting of a fluorescent lamp and also to an image pickup apparatus adapted to use such a method and such a circuit.

2. Description of the Related Art

When an image of a subject is picked up by means of a video camera in direct light from a fluorescent lamp energized by a commercial AC power supply, temporal fluctuations, or so-called flicker, occur in the lightness of the video signal output as a result of the image pickup operation due to the difference between the frequency (twice as high as a commercial AC power supply) of luminance change of the fluorescent lamp (change in the quantity of light) and the vertical synchronizing frequency of the camera.

For example, when an image of a subject is picked up by a CCD camera of the NTSC system (with the vertical synchronizing frequency of 60 Hz) under the lighting of a non-inverter type fluorescent lamp in a geographical area where the frequency of the commercially supplied AC is 50 Hz, the exposure value of each pixel changes every field as shown in FIG. 1 of the accompanying drawings because of that a field period is 1/60 seconds while the period of luminance change of the fluorescent lamp is 1/100 seconds and hence the timing of exposure of each field is shifted relative to the luminance change of the fluorescent lamp.

The timing of exposure relative to the luminance change of the fluorescent lamp returns to the original one in every three fields and therefore the change of lightness is cyclic and repetitive with a period of three fields. In other words, the luminance ratio of each field (how flickering appears) changes with the exposure period but the period of flicker does not change.

However, the change of lightness in every three frames is repeated with progressive type cameras such as digital cameras when the vertical synchronizing frequency is 30 Hz.

In the case of an XY address scanning type imaging element, which may typically be a CMOS imaging element, the timing of exposure of each pixel is sequentially shifted from that of the preceding pixel in the horizontal direction by a clock (pixel clock) period and hence the timings of exposure of all the pixels differ from each other so that flicker arises in each frame and recognized as a pattern of black strips in the image. In other words, there arises a seriously degraded image.

Techniques have been proposed to reduce flicker under the lighting of a fluorescent lamp that arises in video signals coming from an XY address scanning type imaging element by extracting still parts where no moving subject exists, detecting flicker from the extracted areas and correcting the flicker (see, for example, Patent Document 1: Jpn. Pat. Appln. Laid-Open Publication No. 2001-119708).

SUMMARY OF THE INVENTION

However, when a moving subject comes into the scene to occupy the entire area of the picked up image, it is no longer possible to detect flickering because there is no still part in the image. Additionally, since the above-described arrangement uses a plurality of areas produced by dividing an image, it is accompanied by a disadvantage of increasing the circuit dimensions.

Therefore, it is desirable to prevent degradation of image quality from taking place by correcting flicker without using a plurality of areas in an image and correcting by using values detected in the past without the risk of correcting flicker by error if a moving subject exists in the scene.

Other purposes and specific advantages of the present invention will become apparent from the description given below by way of embodiments.

According to an embodiment of the present invention, there is provided a flicker-reduction method for reducing a flicker component of a fluorescent lamp contained in a video signal obtained by shooting a subject by means of an XY address scanning type imaging element under a lighting of a fluorescent lamp, the method including: an integration step of integrating the input video signal obtained by shooting the subject over a time period greater than a horizontal period; a normalization step of normalizing an integral value obtained in the integration step or the difference value between integral values of adjacent fields or frames: an extraction step of extracting the spectrum of the integral value or the difference value normalized in the normalization step; an estimation step of estimating the flicker component from the spectrum extracted in the extraction step; a subtraction step of acquiring the current integral value obtained by integrating the input video signal over a time period greater than a horizontal period and the integral value of a field preceding the current field by several fields and determining the difference of the integral values; a computation step of computing the probability of being under the lighting of a fluorescent lamp from the difference of the integral values determined in the subtraction step; a flicker-reduction signal generation step of generating a flicker-reduction signal for canceling the flicker component estimated in the estimation step according to the probability of being under the lighting of a fluorescent lamp as computed from the difference of the integral values; and an arithmetic operation step of subjecting the flicker-reduction signal generated in the flicker-reduction signal generation step and the input video signal to an arithmetic operation.

According to an embodiment of the present invention, there is also provided a flicker-reduction circuit for reducing a flicker component of a fluorescent lamp contained in a video signal obtained by shooting a subject by means of an XY address scanning type imaging element under a lighting of a fluorescent lamp, the circuit including: an integration means for integrating the input video signal obtained by shooting the subject over a time period greater than a horizontal period; a normalization means for normalizing an integral value obtained by the integration means or the difference value between integral values of adjacent fields or frames; an extraction means for extracting the spectrum of the integral value or the difference value normalized by the normalization means; an estimation means for estimating the flicker component from the spectrum extracted by the extraction means;

a subtraction means for acquiring the current integral value obtained by integrating the input video signal over a time period greater than a horizontal period and the integral value of a field preceding the current field by several fields and determining the difference of the integral values; a computation means for computing the probability of being under the lighting of a fluorescent lamp from the difference of the integral values determined by the subtraction means; a flicker-reduction signal generation means for generating a flicker-reduction signal for canceling the flicker component estimated by the estimation means according to the probability of being under the lighting of a fluorescent lamp as computed from the difference of the integral values; and an arithmetic operation means for subjecting the flicker-reduction signal generated by the flicker-reduction signal generation means and the input video signal to an arithmetic operation.

According to an embodiment of the present invention, there is also provided an image pickup apparatus having a flicker-reduction circuit for reducing a flicker component of a fluorescent lamp contained in a video signal obtained by shooting a subject by means of an XY address scanning type imaging element under a lighting of a fluorescent lamp, the circuit including: an integration means for integrating the input video signal obtained by shooting the subject over a time period greater than a horizontal period; a normalization means for normalizing an integral value obtained by the integration means or the difference value between integral values of adjacent fields or frames; an extraction means for extracting the spectrum of the integral value or the difference value normalized by the normalization means; an estimation means for estimating the flicker component from the spectrum extracted by the extraction means; a subtraction means for acquiring the current integral value obtained by integrating the input video signal over a time period greater than a horizontal period and the integral value of a field preceding the current field by several fields and determining the difference of the integral values; a computation means for computing the probability of being under the lighting of a fluorescent lamp from the difference of the integral values determined by the subtraction means; a flicker-reduction signal generation means for generating a flicker-reduction signal for canceling the flicker component estimated by the estimation means according to the probability of being under the lighting of a fluorescent lamp as computed from the difference of the integral values; and an arithmetic operation means for subjecting the flicker-reduction signal generated by the flicker-reduction signal generation means and the input video signal to an arithmetic operation.

Thus, according to the present invention, it is possible to detect and correct the flicker of a fluorescent lamp specific to XY address scanning type imaging elements, which may typically be CMOS elements, regardless of the subject being shot, the video signal level and the type of the fluorescent lamp and reduce erroneous corrections due to a moving subject without using a light receiving element and a plurality of areas. Therefore, it is possible to correct flicker by using values detected in the past without erroneous corrections and prevent the image quality from being degraded by flicker even when the moving subject exists.

DETAILED DESCRIPTION OF THE PREFERRED EMBODIMENTS

Now, preferred embodiments according to the present invention will be described in greater detail by referring to the accompanying drawings. However, the present invention is by no means limited to the embodiments described below, which may be modified and altered in various different ways without departing from the spirit and scope of the present invention.

Figure 1:
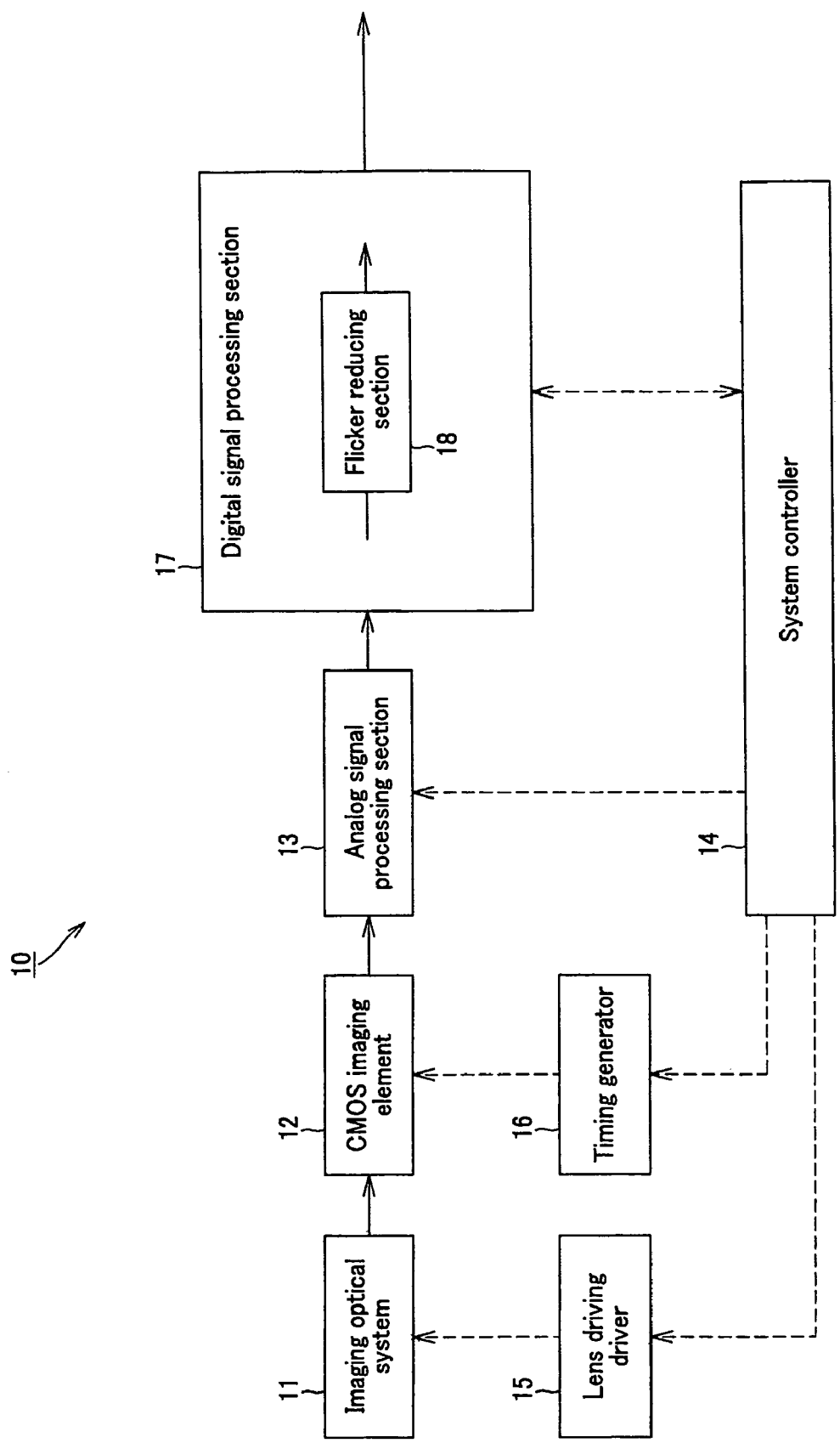
FIG. 1 is a schematic block diagram of image pickup apparatus according to an embodiment of the present invention.

For example, the present invention is applicable to an image pickup apparatus having a configuration shown in FIG. 1.

Referring to FIG. 1, the image pickup apparatus 10 is a video camera realized by using an XY address scanning type imaging element, which is a CMOS imaging element 12. The image pickup apparatus 10 includes an imaging optical system 11, a CMOS imaging element 12, an analog signal processing section 13, a system controller 14, a lens driving driver 15, a timing generator 16 and a digital signal processing section 17.

With this image pickup apparatus 10, light from a subject enters the CMOS imaging element 12 by way of an imaging optical system 11 and is subjected to photoelectric conversion in the CMOS imaging element 12 so that analog video signals are obtained from the CMOS imaging element 12.

The CMOS imaging element 12 is formed by arranging a plurality of pixels having photodiodes (photo gates), transfer gates (shutter transistors), switching transistors (address transistors), amplifier transistors and reset transistors (reset gates) two-dimensionally on a CMOS substrate along with a vertical scanning circuit, a horizontal scanning circuit and a video signal output circuit.

The CMOS imaging element 12 may be of the primary color system or of the complementary color system and the analog video signals obtained from the CMOS imaging element 12 may be primary color signals of RGB or color signals of the complementary color system.

The analog video signals from the CMOS imaging element 12 are subjected to a sample hold process for each color by analog signal processing section 13 that is realized as an IC (integrated circuit) and controlled for the gain by AGC (automatic gain control) before being converted into digital signals by A/D conversion.

The digital video signals from the analog signal processing section 13 are processed by digital signal processing section 17 that is realized as an IC and the flicker component of each signal is reduced by flicker reducing section 18 in the digital signal processing section 17 before they are ultimately converted into luminance signals Y and color difference signals R-Y, B-Y and output from the digital signal processing section 17.

The system controller 14 is typically realized as a microcomputer so as to control the components of the camera.

More specifically, a lens drive control signal is supplied from the system controller 14 to lens driving driver 15 that is realized as IC and the lenses of the imaging optical system 11 are driven by the lens driving driver 15.

Similarly, a timing control signal is supplied from the system controller 14 to the timing generator 16 and various timing signals are supplied from the timing generator 16 to the CMOS imaging element 12 to drive the CMOS imaging element 12.

Additionally, the detection signal of each signal component is taken into the system controller 14 from the digital signal processing section 17 so that color signals of different colors are controlled for gain by the analog signal processing section 13 according to the AGC signal from the system controller 14 as described above and the signal processing operation of the digital signal processing section 17 is also controlled by the system controller 14.

Figure 2:
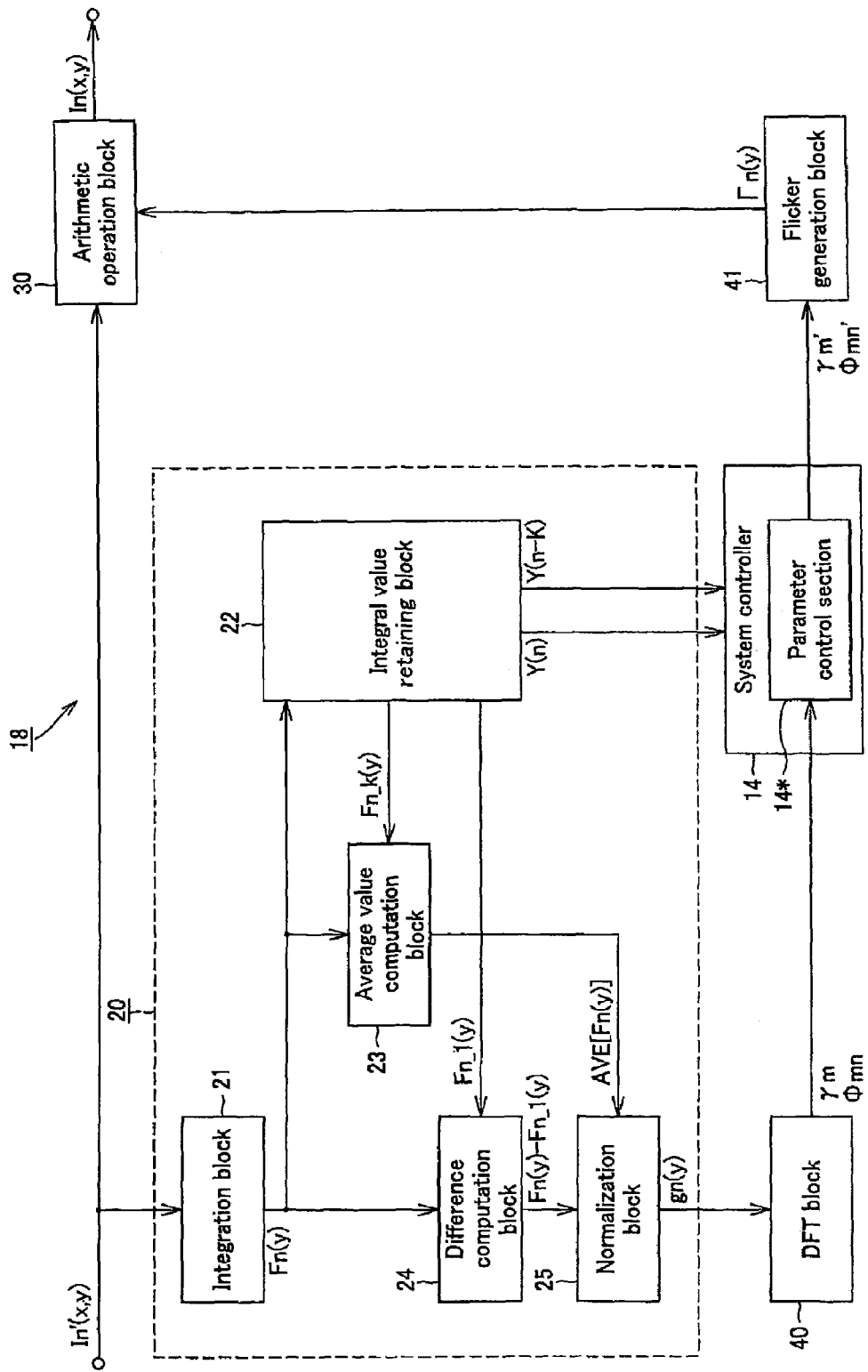
FIG. 2 is a schematic block diagram of the flicker reducing section arranged in the digital signal processing section of the embodiment of image pickup apparatus of FIG. 1.

As shown in FIG. 2, the flicker reducing section 18 arranged in the above-described digital signal processing section 17 includes a normalization process block 20 and an arithmetic operation block 30, to which digital video signals are supplied from the above-described analog signal processing section 13, as well as a DFT block 40 connected the normalization process block 20 and a flicker generation block 41 connected to the arithmetic operation block 30.

The normalization process block 20 by turn includes an integration block 21, to which input video signals In'(x, y), or digital video signals, are supplied from the above-described analog signal processing section 13, an integral value retaining block 22 connected to the integration block 21, an average value computing block 23, a difference computing block 24, and a normalization block 25.

Figure 3:
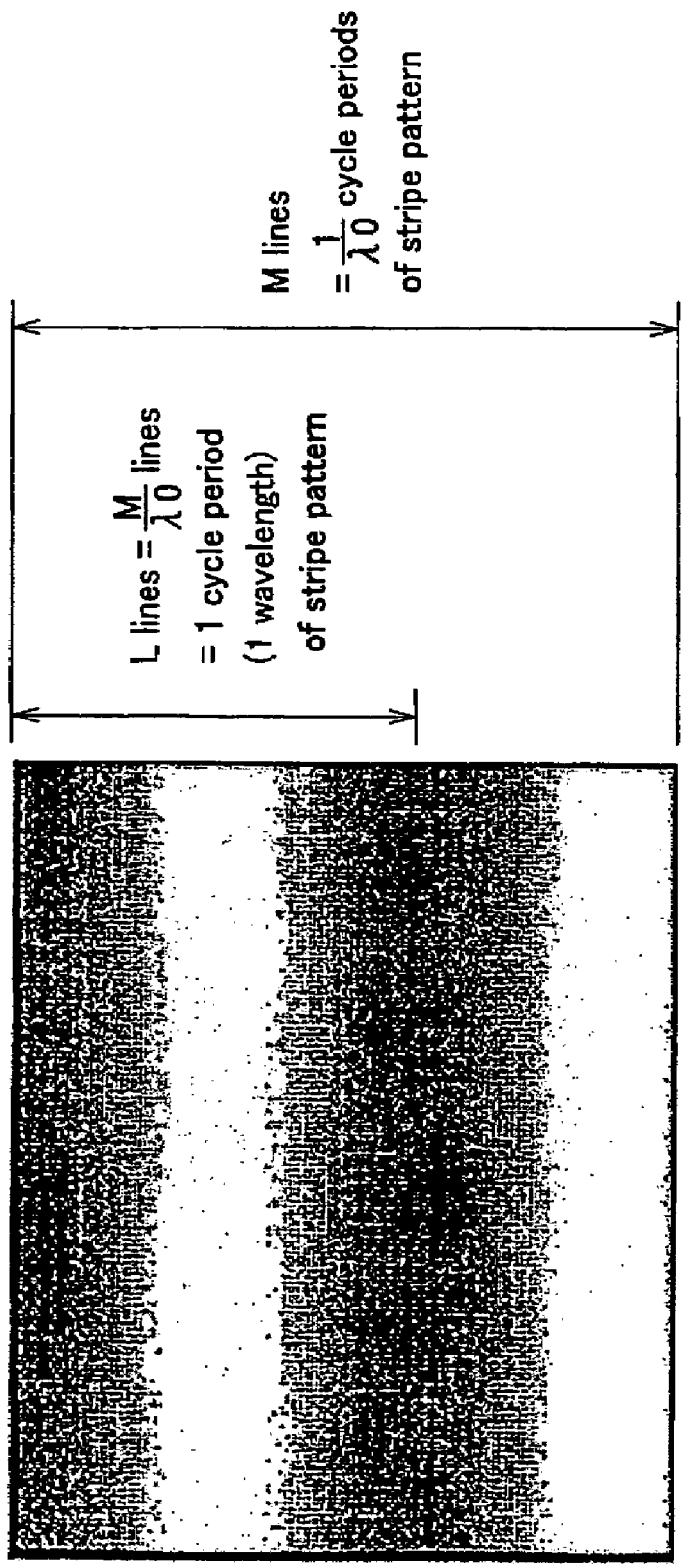
FIG. 3 is a schematic illustration of the flicker of an image where the shot subject is a uniform pattern.

As shown in FIG. 3 that illustrates the flicker of an image when the subject is a uniform pattern, the flicker component is generally proportional to the signal intensity of the subject.

Thus, if the input video signal (a luminance signal or an RGB primary color signal before being subjected to a flicker reducing process) of a subject at an arbitrarily selected pixel (x, y) in an arbitrarily selected field n is In' (x, y), In' (x, y) is the sum of the signal component that does not contain the flicker component and the flicker component that is proportional to the signal component as expressed by the formula (1) shown below.

$$In'(x, y) = [1 + \Gamma n(y)] \times In(x, y) \quad (1)$$

In the formula (1), In (x, y) is the signal component and $\Gamma n$ (y)×In (x, y) is the flicker component, where $\Gamma n$ (y) is the flicker coefficient. Since a horizontal period is very short relative to the light emitting period of the fluorescent lamp, it is possible to assume that the flicker coefficient is constant for the same line in the same field. Therefore, the flicker coefficient is expressed by $\Gamma n$ (y).

To generalize $\Gamma n$ (y), it will be developed into a Fourier series as indicated by formula (2) shown below.

$$\Gamma n(y) = \sum_{m=1}^{\infty} \gamma m \times \cos\left[m \times \frac{2\pi}{\lambda 0} \times y + \Phi m, n\right] \quad (2)$$

$$= \sum_{m=1}^{\infty} \gamma m \times \cos(m \times \omega 0 \times y + \Phi m, n)$$

where $$\lambda_0 = \frac{2 \times f_L}{f_V}$$

Then, it is possible to express a flicker coefficient in a form of comprehensively including different light emission characteristics and afterglow characteristics that vary as a function of the type of fluorescent lamp.

Referring to the formula (2), λo is the wavelength of the in-image flicker shown in FIG. 3. If the number of lines read out per field is M, it corresponds to L (=M/λo) lines. In the formula (2), ωo is the standardized angular frequency that is normalized by λo.

In the formula (2), γm is the amplitude of the flicker component of each degree (m=1, 2, 3, . . . ) and Φmn indicates the initial phase of the flicker component of each degree that is determined as a function of the light emission period of the fluorescent lamp and the exposure timing. Note, however, that Φmn is determined by the vertical synchronizing frequency and the frequency of the fluorescent lamp and hence the difference of Φmn between a field and an immediately preceding field, or ΔΦm, n is expressed by formula (3) shown below.

$$\Delta\Phi_{m,n} = -m \times \lambda_0 \times 2\pi \quad (3)$$

In the integration block 21 of the flicker reducing section 18, the input video signal In'(x, y) is integrated over a line in the horizontal direction of the image plane to determine the integral value Fn (y) as expressed by formula (4) shown below in order, which reduces the influence of the image pattern when detecting flicker.

$$\Gamma n(y) = \sum_{X} In'(x, y) \quad (4)$$

$$= \sum_{X} ([1 + \Gamma n(y)] \times In(x, y))$$

$$= \sum_{X} \Gamma n(y) + \Gamma n(y) \sum_{X} In(x, y)$$

$$= \alpha_n(y) + \alpha_n(y) \times \Gamma n(y)$$

In the formula (4), α n (y) is the integral value over a line of the signal component In(x, y) that is expressed by formula (5) shown below.

$$\alpha_n(y) = \sum_X In(x, y) \quad (5)$$

The computationally determined integral value Fn (y) is stored and retained in integral value retaining block 22 for the purpose of flicker detection in the subsequent fields. The integral value retaining block 22 is so designed as to be able to retain the integral values of at least K fields. Note that K is the number of fields necessary for canceling the flicker component that is obtained from the vertical synchronizing frequency fv and the frequency of the fluorescent lamp by means of formula (6) shown below. In the formula (6), GCD is a function for determining the greatest common divisor.

$$K = \frac{f_V}{GCD(2 \times f_L, f_V)} \quad (6)$$

If the subject is a uniform one, the integral value αn (y) of the signal component In (x, y) is a constant value and hence it is easy to extract the flicker component αn (y)×Γn (y) from the integral value Fn (y) of the input video signal In' (x, y).

However, a subject generally contains m×ω0 component in αn (y) and hence it is not possible to isolate the luminance component and the color component of the flicker component from the luminance component and the color component of the signal component of the subject itself. In short, it is not possible to purely extract only the flicker component. Additionally, since the flicker component of the second term is very small relative to the signal component of the first term in the formula (4), the flicker component is substantially buried in the signal component.

Additionally, the flicker reducing section 18 uses the integral value of continuous K fields in order to remove the influence of αn (y) from the integral value Fn (y).

More specifically, in this example, when computationally determining the integral value Fn (y) of a line, the integral value Fn−(K−1) (y) of the same line in the (K−1) preceding field and the integral value Fn_1 (y) of the same line in the immediately preceding field are read out from an integral value retaining block 22 and the average vale AVE [Fn (y)] of K integral values Fn (y), . . . , Fn−(K−1) (y) is computationally determined.

If the subject can be regarded substantially same in the period of the K consecutive fields, it is possible to regard the value of αn (y) same for the K consecutive fields. If the movement of the subject is sufficiently small in the K fields, the above assumption does not practically give rise to any problem. Additionally, when computing the average value of the integral values of K consecutive fields, the signals where the phase of the flicker component is sequentially shifted by −λ0×m×2π are added as seen from the relationship of the formula (3) so that consequently the flicker components are cancelled. Therefore, the average value AVE [Fn (y)] is expressed by formula (7) shown below.

$$AVE[Fn(y)] = \frac{1}{K} \sum_{k=0}^{K-1} Fn\_k(y) \quad (7)$$

-continued $$= \frac{1}{K} \left\{ \sum_{k=0}^{K-1} \alpha_{n\_k}(y) + \alpha_{n\_k}(y) \times \Gamma n\_k(y) \right\}$$

$$= \frac{1}{K} \sum_{k=0}^{K-1} \alpha_{n\_k}(y) + \frac{1}{K} \sum_{k=0}^{K-1} \alpha_{n\_k}(y) \times \Gamma n\_k(y)$$

$$= \alpha_n(y) + \frac{1}{K} \alpha_n(y) \sum_{k=0}^{K-1} \Gamma n\_k(y)$$

$$= \alpha_n(y)$$

Note that the average value of the integral values of K consecutive fields is computationally determined in the above description on an assumption that the approximation of formula (8) shown below. However, the approximation of the formula (8) does not hold true when the movement of the subject is large.

$$\alpha_n(y) \cong \alpha_{n-1}(y) \cong \alpha_{n-2}(y) \quad (8)$$

Then, it is sufficient that the flicker reducing section 18 provided for a situation where the movement of the subject is large retains the integral values of not less than three fields in the integral value retaining block 22 and computationally determines the average value of the integral values of not less than (K+1) fields including the integral value Fn (y) of the current field. With this arrangement, it is possible to reduce the influence of the movement of the subject due to the effect of a temporal low pass filter that operates.

Additionally, in the flicker reducing section 18, the normalization block 25 normalizes the difference value Fn (y)−Fn_1 (y) from the difference computing block 24 as it divides the difference value by the average value AVE [Fn (y)] from the average value computing block 23 to computationally determine the normalized difference value gn (y).

The normalized difference value gn (y) is developed into formula (10) shown below by means of the above formula (7) and formula (9) shown below and the addition/multiplication formula of trigonometric function and expressed by formula (11) below from the relationship of the above formula (3).

$$Fn(y) - Fn\_1(y) = \{\alpha_n(y) + \alpha_n(y) \times \Gamma n(y)\} - \quad (9)$$
$$\{\alpha_{n\_1}(y) + \alpha_{n\_1}(y) \times \Gamma n\_1(y)\}$$
$$= \alpha_n(y) \times \{\Gamma n(y) - \Gamma n\_1(y)\}$$
$$= \alpha_n(y) \sum_{m=1}^{\infty} \gamma m \times \{\cos(m \times \omega 0 \times y + \Phi m, n) -$$
$$\cos(m \times \omega 0 \times y + \Phi m, n\_1)\}$$

$$g_n(y) = \frac{\{F_n(y) - F_{n\_1}(y)\}}{AVE[Fn(y)]} \quad (10)$$

$$= \sum_{m=1}^{\infty} \gamma_m \times \{\cos(m \times \omega_0 \times y + \Phi_{m,n}) -$$
$$\cos(m \times \omega_0 \times y + \Phi_{m,n\_1})$$

$$= \sum_{m=1}^{\infty} (-2) \times \gamma_m \times \sin\left(m \times \omega_0 \times y + \frac{\Phi_{m,n} + \Phi_{m,n\_1}}{2}\right) \times$$
$$\sin\left(\frac{\Phi_{m,n} - \Phi_{m,n\_1}}{2}\right)$$

-continued $$g_n(y) = \sum_{m=1}^{\infty} (-2) \times \gamma_m \times \sin\left(m \times \omega_0 \times y + \Phi_{m,n} + \frac{\Delta\Phi_{m,n}}{2}\right) \times \quad (11)$$

$$\sin\left(-\frac{\Delta\Phi_{m,n}}{2}\right)$$

$$= \sum_{m=1}^{\infty} 2 \times \gamma_m \times \cos\left(m \times \omega_0 \times y + \Phi_{m,n} + \frac{\Delta\Phi_{m,n}}{2} - \frac{\pi}{2}\right) \times$$

$$\sin\left(\frac{\Delta\Phi_{m,n}}{2}\right)$$

$$= \sum_{m=1}^{\infty} 2 \times \gamma_m \times \sin\left(\frac{\Delta\Phi_{m,n}}{2}\right) \times$$

$$\cos\left(m \times \omega_0 \times y + \Phi_{m,n} + \frac{\Delta\Phi_{m,n}}{2} - \frac{\pi}{2}\right)$$

$$= \sum_{m=1}^{\infty} |A_m| \times \cos(m \times \omega_0 \times y + \theta_m)$$

Note that $|A_m|$ and $\theta_m$ in the formula (11) are respectively expressed by formulas (12) and (13) shown below.

$$|A_m| = 2 \times \gamma_m \times \sin\left(\frac{\Delta\Phi_{m,n}}{2}\right) \quad (12)$$

$$\theta_m = \Phi_{m,n} + \frac{\Delta\Phi_{m,n}}{2} - \frac{\pi}{2} \quad (13)$$

Since the influence of the signal intensity of the subject remains on the difference value Fn (y)−Fn_1 (y), the level of the luminance change and that of the color change due to flickering can vary depending on an area in the image. However, the level of the luminance change and that of the color change can be equalized over all the areas of the image as a result of the above-described normalization.

Note that $|A_m|$ and $\theta_m$ that are expressed respectively by the above formulas (12) and (13) are the amplitude and the initial phase of the spectrum of each degree of the normalized difference value gn (y). Thus, by means of formulas (14) and (15) shown below, it is possible to determine the amplitude γm and the initial phase $\Phi$mn of the flicker component of each degree shown in the above-described formula (2), when the normalized difference value gn (y) is Fourier transformed and the amplitude $|A_m|$ and the initial phase $\theta_m$ of the spectrum of each degree are detected.

$$\gamma_m = \frac{|A_m|}{2 \times \sin\left(\frac{\Delta\Phi_{m,n}}{2}\right)} \quad (14)$$

$$\Phi_{m,n} = \theta_m - \frac{\Delta\Phi_{m,n}}{2} + \frac{\pi}{2} \quad (15)$$

In the instance of the flicker reducing section 18 shown in FIG. 2, DFT block 40 performs a discrete Fourier transform of the data that corresponds to the wavelength (for line L) of the flicker in the normalized difference value gn (y) obtained from the normalization block 25.

If the DFT operation is DFT [gn (y)] and the result of the DFT of degree m is Gn (m), the DFT operation is expressed by formula (16) shown below.

$$DFT[gn(y)] = Gn(m) = \sum_{i=0}^{L-1} gn(i) \times W^{m \times i} \quad (16)$$

W in the formula (16) is expressed by formula (17) shown below.

$$W = \exp\left[-j \times \frac{2\pi}{L}\right] \quad (17)$$

By the definition of DFT, the relationship between the above-described formulas (12) and (13) and the formula (16) is expressed by formulas (18) and (19) shown below.

$$|Am| = 2 \times \frac{|Gn(m)|}{L} \quad (18)$$

$$\theta m = \tan^{-1}\left(\frac{\text{Im}(Gn(m))}{\text{Re}(Gn(m))}\right) \quad (19)$$

where
Im(Gn(m)):imaginary part
Re(Gn(m)):real part

Thus, from the formulas (14), (15), (18) and (19), it is possible to determine the amplitude γm and the initial phase $\Phi$mn of the flicker component of each degree by means of formulas (20) and (21) shown below.

$$\gamma m = \frac{|Gn(m)|}{L \times \sin\left(\frac{\Delta\Phi_{m,n}}{2}\right)} \quad (20)$$

$$\Phi m, n = \tan^{-1}\left(\frac{\text{Im}(Gn(m))}{\text{Re}(Gn(m))}\right) - \frac{\Delta\Phi_{m,n}}{2} + \frac{\pi}{2} \quad (21)$$

The data length of the DFT operation is made equal to the wavelength of the flicker because, by doing so, it is made possible to directly obtain a group of discrete spectra of integer times of ωo.

Generally, FFT (fast Fourier transform) is used for a Fourier transform when processing a digital signal. Nevertheless, however, DFT is used in this embodiment of the present invention. The reason for this is that DFT is more convenient than FFT because the data length of the Fourier transform is not equal to a power-of-two. However, it is also possible to use FFT by processing the input/output data.

Under the lighting of a fluorescent lamp, it is actually possible to satisfactorily approximate the flicker component even if the range of the number m is limited to b less than the tenth. Therefore, since it is not necessary to output all the data of the DFT operation, the use of DFT is not disadvantageous for the purpose of the present invention if compared with the use of FFT in terms of efficiency of operation.

The DFT block 40 firstly extracts spectra with a DFT operation defined by the formula (16) and subsequently the amplitude γm and the initial phase $\Phi$mn of the flicker component of each degree are estimated by means of operations using the formulas (21) and (22).

In the flicker reducing section 18 of FIG. 2, the flicker generation block 41 computationally determines the flicker coefficient Γn (y) expressed by the above-described formula (2) from the estimated values of γm and Φmn obtained from the DFT block 40.

However, as pointed out above, under the lighting of a fluorescent lamp, it is actually possible to satisfactorily approximate the flicker component if the range of the degree m is limited to be less than the tenth. Therefore, when computationally determining the flicker coefficient Γn (y) by means of the formula (2), it is possible to limit the degree of summation to a predetermined number, for example to the second order so as not to make it infinite.

From the above-described formula (1), the signal component In (x, y) that does not contain any flicker component is expressed by formula (22) shown below.

$$In(x, y) = \frac{In'(x, y)}{1 + \Gamma n(y)} \quad (22)$$

In the flicker reducing section 18 of FIG. 2, arithmetic operation block 30 adds one to the flicker coefficient Γn (y) obtained from the flicker generation block 41 and divides the input video signal In' (x, y) by the sum [1+Γn (y)].

Then, as a result, the flicker component contained in the input video signal In' (x, y) is substantially completely eliminated and a signal component In (x, y) that practically does not contain any flicker component is obtained as output video signal (RGB primary color signal or luminance signal with a reduced flicker) from the arithmetic operation block 30.

The system controller 14 of the image pickup apparatus 10 receives the amplitude γm and the initial phase Φmn of the flicker component from the DFT block 40 of the above-described flicker reducing section 18 as inputs and is provided with a parameter control section 14*, to which the integral value Y(n) and the integral value Y(n−k) of the flicker detecting area of the K preceding field from the integral value retaining block 22 are supplied.

Figure 4:
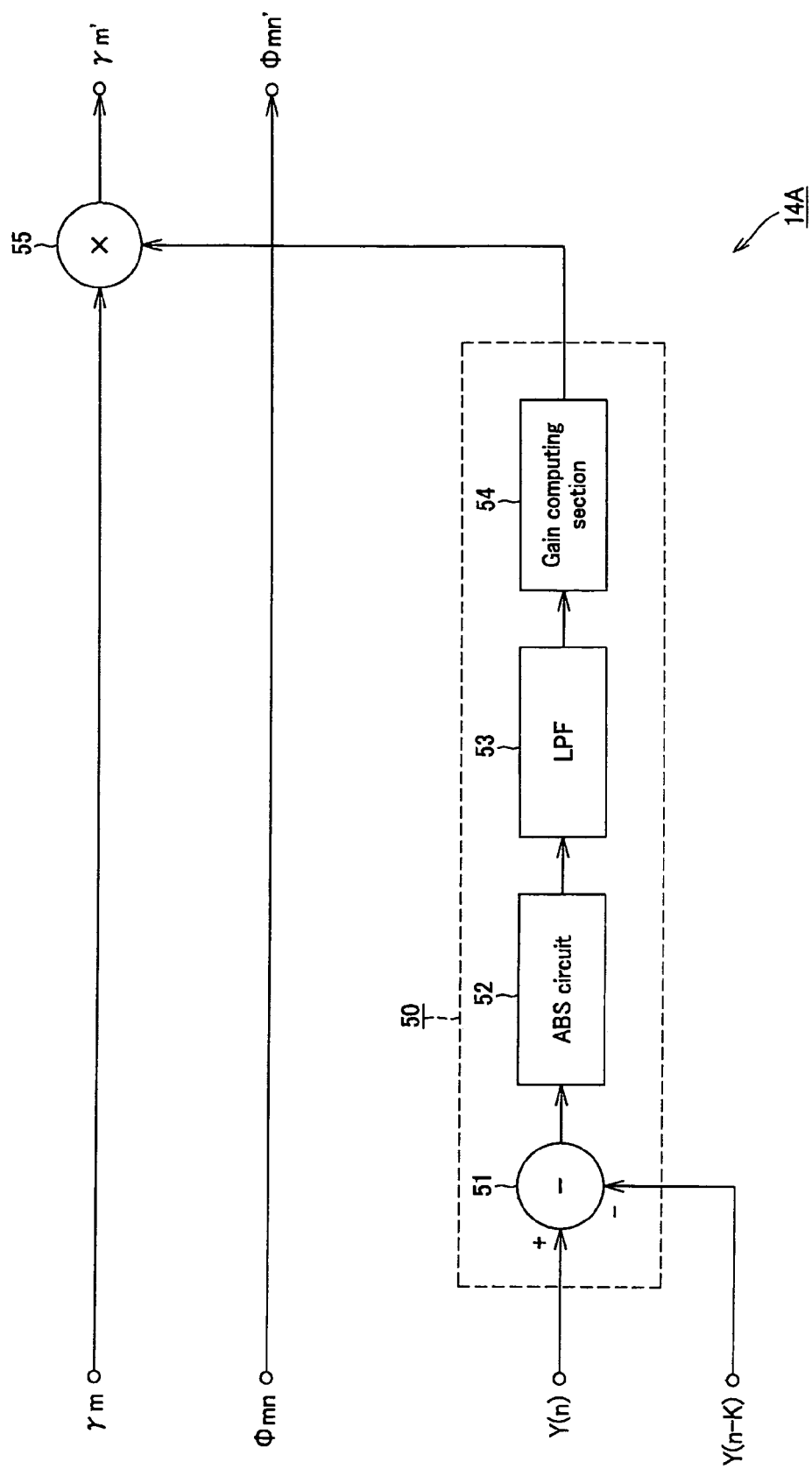
FIG. 4 is a schematic block diagram of the parameter control section arranged in the system controller of the image pickup apparatus of FIG. 1.

The parameter control section 14* may typically be a parameter control section 14A having a configuration as shown in FIG. 4.

The parameter control section 14A includes an amplitude gain computing section 50 and a multiplier 55.

The parameter control section 14A receives as inputs the amplitude γm and the initial phase Φmn of the flicker component of each degree determined by the DFT block 40.

The amplitude gain computing section 50 is adapted to output the suppressed gain of the amplitude γm of the flicker component from both the total integral value Y(n) of the current flicker detecting area and the total integral value Y(n−k) of the flicker detecting area of the K preceding field. The amplitude gain computing section 50 includes a subtracter 51, to which the integral value Y (n) of the current flicker detecting area and the integral value Y(n−k) of the flicker detecting area of the K preceding field are supplied from the integral value retaining block 22, an absolute value (ABS) circuit 52 connected to the subtracter 51, a low pass filter (LPF) 53 connected to the ABS circuit 52, and a gain computing section 54 connected to the LPF 53.

The subtracter 51 computationally determines the difference integral value ΔY(n) of the current integral value Y(n) and the integral value Y(n−K) of the K preceding field.

The ABS circuit 52 turns the output value of the subtracter 51 into the corresponding absolute value. When the output value of the subtracter 51 is small, it is possible to presume that there is no moving subject and the amplitude γm is regarded to be highly reliable. If, on the other hand, the output value of the subtracter 51 is large, the amplitude γm is regarded to be lowly reliable because it is possible to presume that there is a moving subject.

The LPF 53 is a filter for reducing any excessive fluctuations of the difference integral value |ΔY(n)| output from the ABS circuit 52 that arise due to external turbulences. The LPF is preferably arranged with a time constant that provides a time period good for stably determining if the scene to be shot is under the lighting of a fluorescent lamp or under the lighting of non-fluorescent lamp and prevents the LPF from reacting to external turbulences too sensitively.

Figure 5:
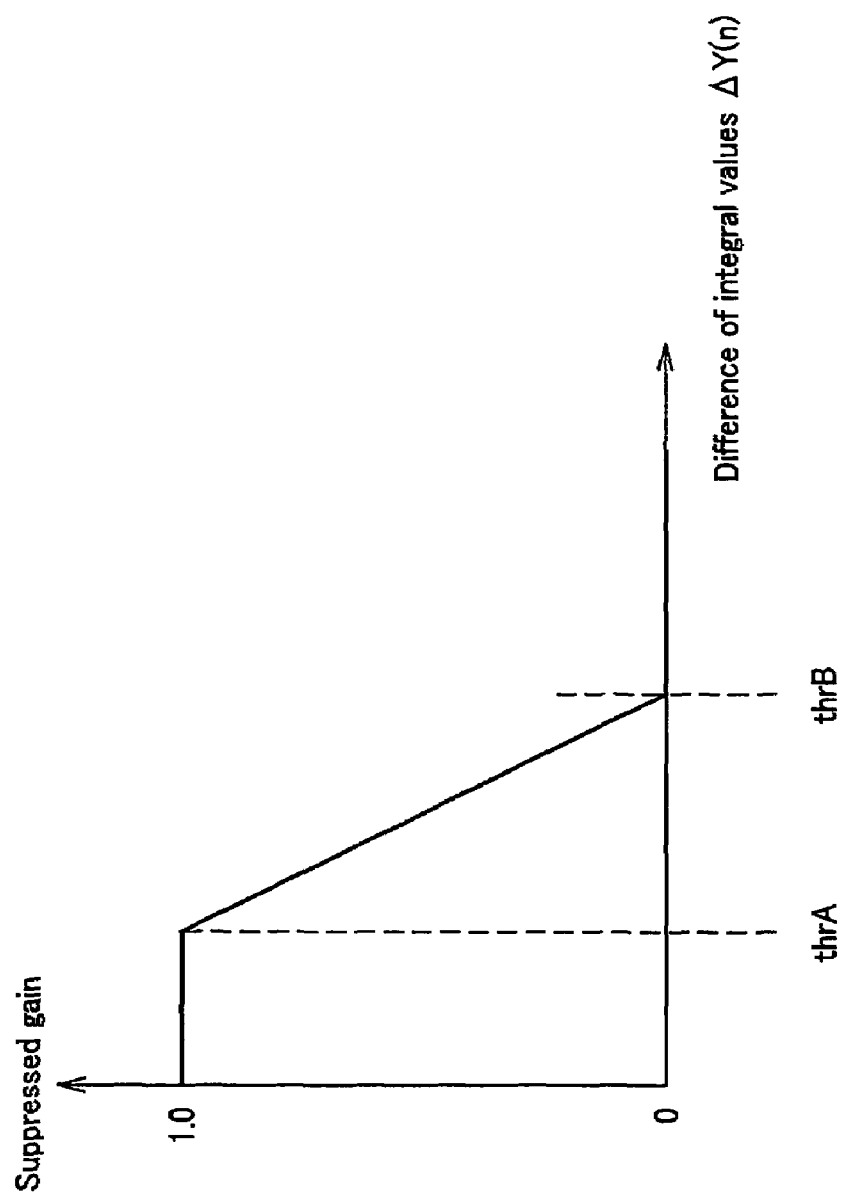
FIG. 5 is a graph of the function of the gain computing section of the parameter control section of FIG. 4.

The gain computing section 54 outputs a value between 0 and 1 according to the output value of the LPF 53 as shown in FIG. 5. More specifically, the gain computing section 54 outputs 0 when the output value of the LPF 53 is greater than a threshold value thrB, whereas it outputs 1 when the output value of the LPF 53 is smaller than a threshold value thrA but it outputs a linearly interpolated value when the output value of the LPF 53 is between the threshold value thrA and the threshold value thrB. In short, it outputs 1 when the reliability of the output of the LPF 53 is high but 0 when the reliability is low.

Then, the multiplier 55 multiplies the amplitude γm of the flicker component of each degree by the output value of the gain computing section 54.

The gain computing process is executed for each degree of DFT. Basically, the first degree of DFT is the main component. However, it is desirable to computationally determine the gain for higher degrees in a situation where the components of higher degrees arise particularly when a high speed shutter is used. Additionally, there arises no problem if the gain is computationally determined constantly for higher degrees because any spectrum other than that of a fluorescent lamp is shifted far from the phase component of a fluorescent lamp and the gain is suppressed consequently.

Figure 6:
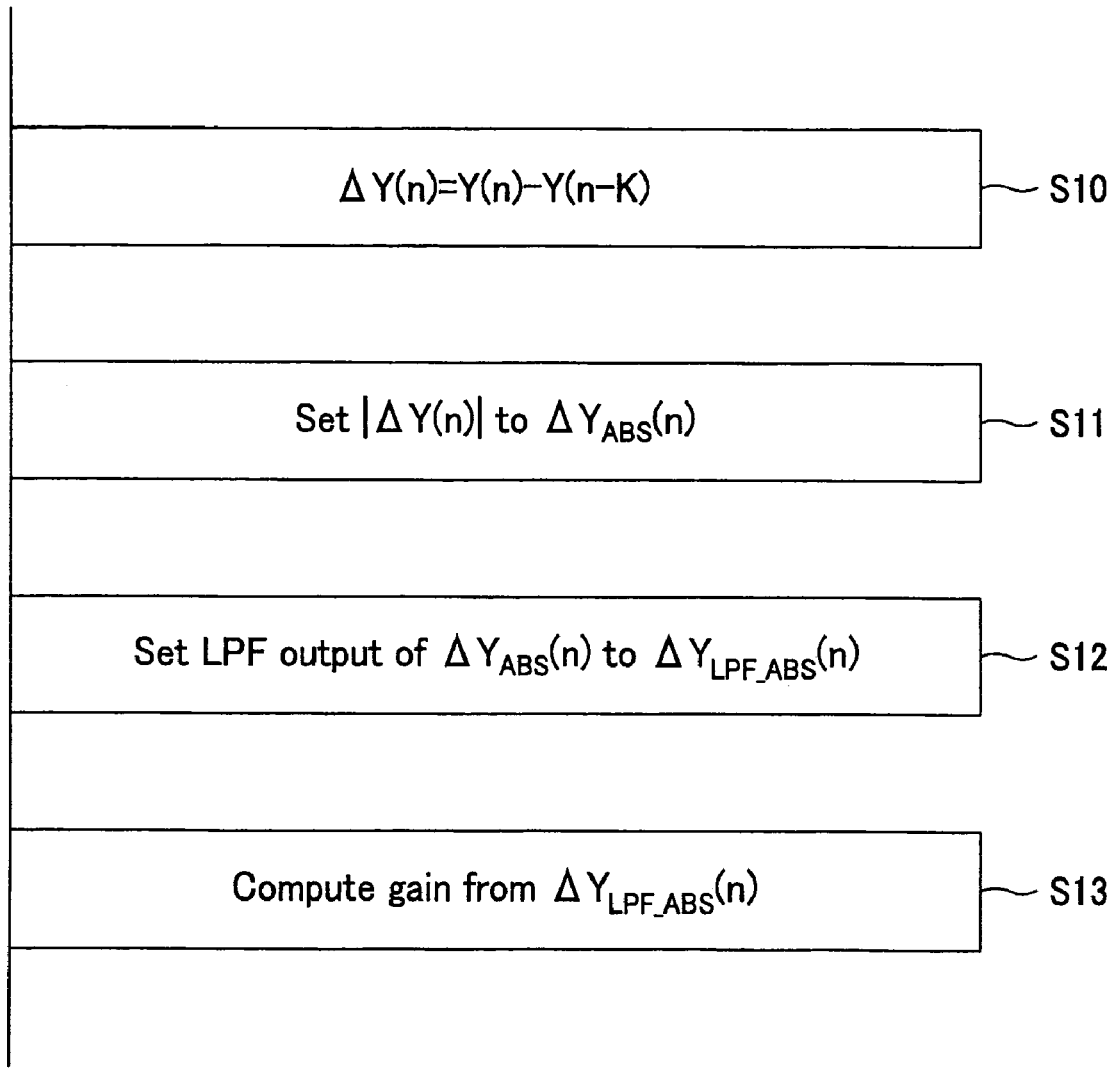
FIG. 6 is a flowchart of the sequence of control operation of the parameter control section of FIG. 4.

FIG. 6 is a flowchart of the sequence of control operation of the parameter control section 14A.

Referring to FIG. 6, in the first step, or Step S10, the difference between the current integral value Y(n) and the integral value Y(n−K) of the K preceding field is set to difference integral value ΔY(n).

In the next step, or Step S11, the absolute value of the different integral value ΔY(n) is set to ΔY$_{ABS}$(n).

In Step S12, the value obtained by applying an LPF process to ΔY$_{ABS}$(n) is set to ΔY$_{LPF\_ABS}$(n).

In Step S13, the suppressed gain is computationally determined by means of the function shown in FIG. 5 from ΔY$_{LPF\_ABS}$(n).

Figure 7:
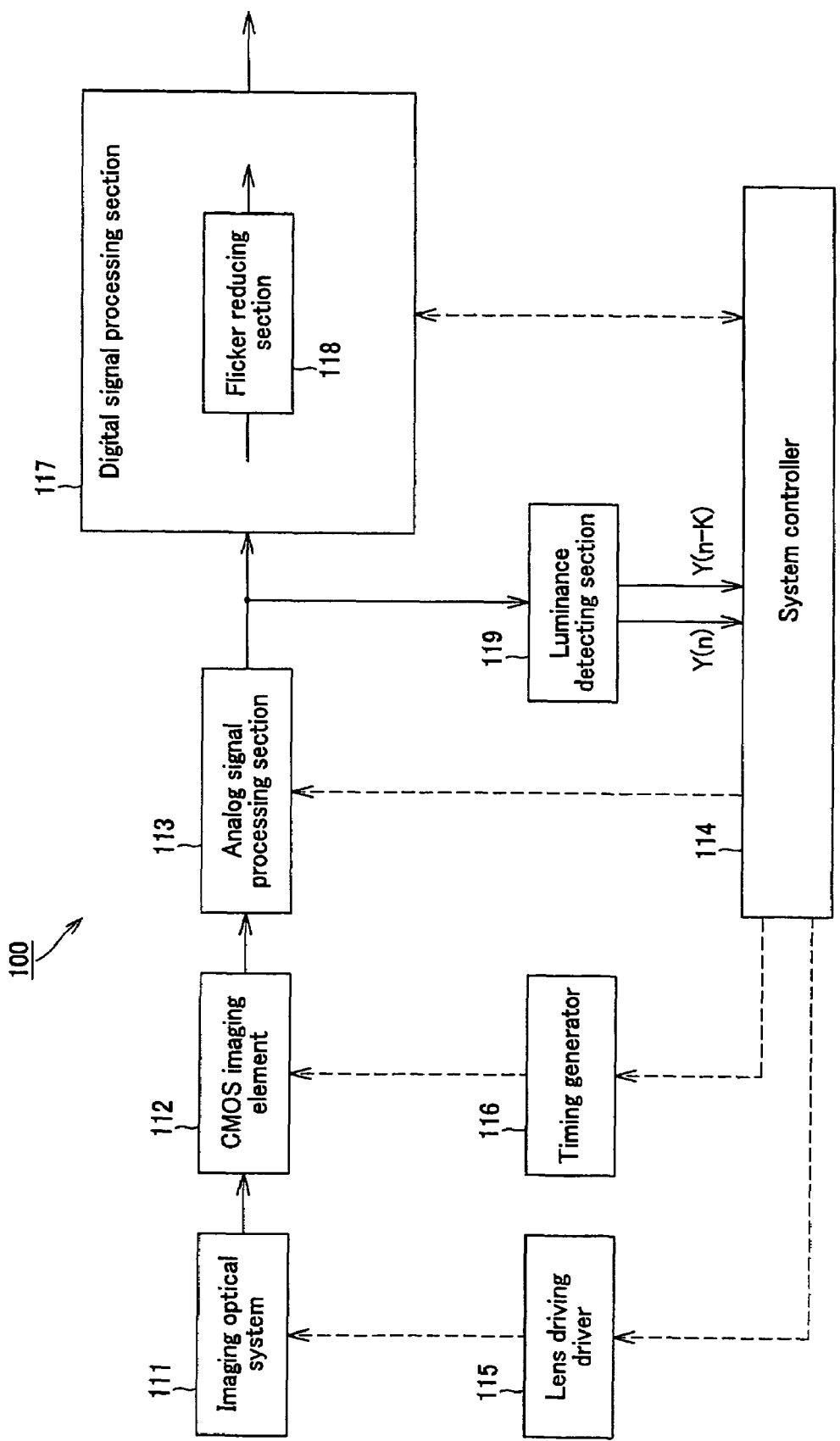
FIG. 7 is a schematic block diagram of another image pickup apparatus according to the embodiment of the present invention.

The present invention can be applied to an image pickup apparatus 100 having a configuration as shown in FIG. 7.

Referring to FIG. 7, the image pickup apparatus 100 is a video camera realized by using an XY address scanning type imaging element, which is a CMOS imaging element 112. The image pickup apparatus 100 includes an imaging optical system 111, a CMOS imaging element 112, an analog signal processing section 113, a system controller 114, a lens driving driver 115, a timing generator 116, a digital signal processing section 117, and a luminance detecting section 119.

With this image pickup apparatus 100, light from a subject enters the CMOS imaging element 112 by way of an imaging optical system 111 and is subjected to photoelectric conversion in the CMOS imaging element 112 so that analog video signals are obtained from the CMOS imaging element 112.

The CMOS imaging element 112 is formed by arranging a plurality of pixels having photodiodes (photo gates), transfer gates (shutter transistors), switching transistors (address transistors), amplifier transistors and reset transistors (reset gates)

two-dimensionally on a CMOS substrate along with a vertical scanning circuit, a horizontal scanning circuit, and a video signal output circuit.

The CMOS imaging element 112 may be of the primary color system or of the complementary color system and the analog video signals obtained from the CMOS imaging element 112 may be primary color signals of RGB or color signals of the complementary color system.

The analog video signals from the CMOS imaging element 112 are subjected to a sample hold process for each color by analog signal processing section 113 that is realized as an IC (integrated circuit) and controlled for the gain by AGC (automatic gain control) before being converted into digital signals by A/D conversion.

The digital video signals from the analog signal processing section 113 are processed by digital signal processing section 117 that is realized as an IC and the flicker component of each signal is reduced by flicker reducing section 118 in the digital signal processing section 117 before they are ultimately converted into luminance signals Y and color difference signals R-Y, B-Y and output from the digital signal processing section 117.

The digital video signals from the analog signal processing section 113 are supplied to the luminance detecting section 119, which luminance detecting section 119 outputs the current luminance level Y(n) and the luminance level of the K preceding field Y(n−K) to the system controller 114.

The system controller 114 is typically realized as a microcomputer so as to control the components of the camera.

More specifically, a lens drive control signal is supplied from the system controller 114 to lens driving driver 115 that is realized as IC and the lenses of the imaging optical system 111 are driven by the lens driving driver 115.

Similarly, a timing control signal is supplied from the system controller 114 to timing generator 116 and various timing signals are supplied from the timing generator 116 to the CMOS imaging element 112 to drive the CMOS imaging element 112.

Additionally, the detection signal of each signal component is taken into the system controller 114 from the digital signal processing section 117 so that color signals of different colors are controlled for gain by the analog signal processing section 113 according to the AGC signal from the system controller 114 as described above and the signal processing operation of the digital signal processing section 120 is also controlled by the system controller 114.

Figure 8:
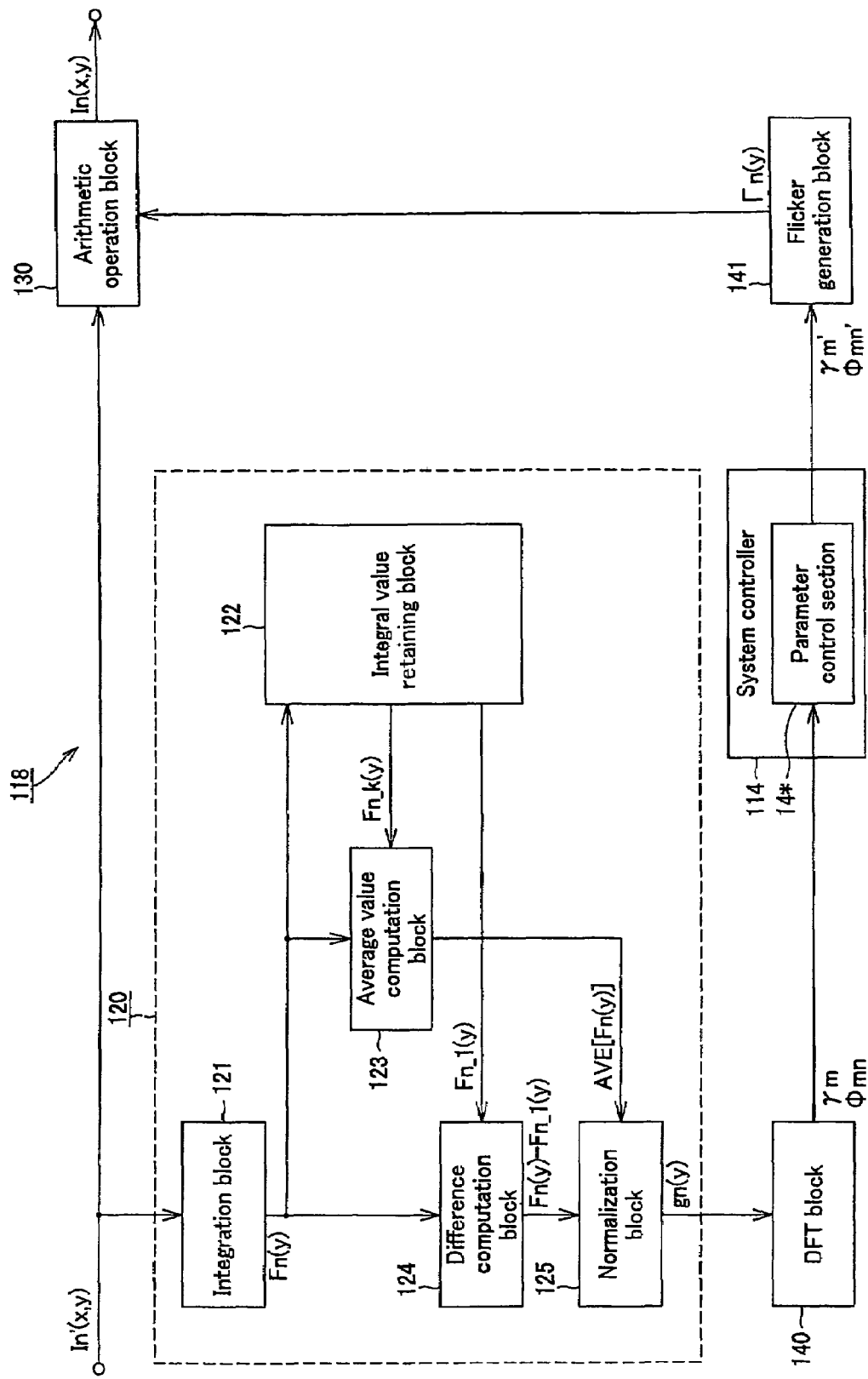
FIG. 8 is a schematic block diagram of the flicker reducing section arranged in the digital signal processing section of the embodiment of image pickup apparatus of FIG. 7.

As shown in FIG. 8, the flicker reducing section 18 arranged in the above-described digital signal processing section 117 includes a normalization process block 120 and an arithmetic operation block 130, to which digital video signals are supplied from the above-described analog signal processing section 113, as well as a DFT block 140 connected to the normalization process block 120 and a flicker generation block 141 connected to the arithmetic operation block 130.

The normalization process block 120 by turn includes an integration block 121, to which input video signals In'(x, y), or digital video signals, are supplied from the above-described analog signal processing section 113, an integral value retaining block 122 connected to the integration block 121, an average value computing block 123, a difference computing block 124, and a normalization block 125.

In the flicker reducing section 118, the input video signal In'(x, y) is integrated over a line in the horizontal direction of the image plane to determine the integral value Fn (y) by the integration block 121 as expressed by the above-described formula (4) shown below in order to reduce the influence of the image when detecting flicker.

The integral value Fn (y) that is computationally determined by the integration block 121 is stored and retained in integral value retaining block 122 for the purpose of flicker detection in the subsequent fields. The integral value retaining block 122 is so designed as to be able to retain the integral values of at least K fields. Note that K is the number of fields necessary for canceling the flicker component that is obtained from the vertical synchronizing frequency fv and the frequency of the fluorescent lamp fl by means of the above-described formula (6). In the formula (6), GCD is a function for determining the greatest common divisor.

If the subject is a uniform one, the integral value $\alpha n$ (y) of the signal component In (x, y) is a constant value and hence it is easy to extract the flicker component $\alpha n$ (y) * $\Gamma n$ (y) from the integral value Fn (y) of the input video signal In' (x, y).

However, a subject generally contains m * $\omega o$ component in $\alpha n$ (y) and hence it is not possible to isolate the luminance component and the color component of the flicker component from the luminance component and the color component of the signal component of the subject itself. In short, it is not possible to purely extract only the flicker component. Additionally, since the flicker component of the second term is very small relative to the signal component of the first term in the formula (4), the flicker component is substantially buried in the signal component.

Additionally, the flicker reducing section 18 uses the integral value of continuous K fields in order to remove the influence of $\alpha n$ (y) from the integral value Fn (y).

More specifically, in this example, when computationally determining the integral value Fn (y) of a line, the integral value Fn−(K−1) (y) of the same line in the (K−1) preceding field and the integral value Fn__1 (y) of the same line in the immediately preceding field are read out from an integral value retaining block 122 and the average vale AVE [Fn (y)] of K integral values Fn (y), . . . , Fn−(K−1) (y) is computationally determined from the average value computing block 123.

If the subject can be regarded substantially same in the period of the K consecutive fields, it is possible to regard the value of $\alpha n$ (y) same for the K consecutive fields. If the movement of the subject is sufficiently small in the K fields, the above assumption does not practically give rise to any problem. Additionally, when computing the average value of the integral values of K consecutive fields, the signals where the phase of the flicker component is sequentially shifted by $-\lambda 0 \times m \times 2\pi$ are added as seen from the relationship of the above-described formula (3). Thus, consequently the flicker components are cancelled. Therefore, the average value AVE [Fn (y)] is expressed by the above-described formula (7).

Note that the average value of the integral values of K consecutive fields is computationally determined in the above description on an assumption that the approximation of the above-described formula (8) shown below holds true. However, the approximation of the formula (8) does not hold true when the movement of the subject is large.

Then, it is sufficient that the flicker reducing section 18 provided for a situation where the movement of the subject is large retains the integral values of not less than three fields in the integral value retaining block 122 and computationally determines the average value of the integral values of not less than (K+1) fields including the integral value Fn (y) of the current field. With this arrangement, it is possible to reduce the influence of the movement of the subject due to the effect of a temporal low pass filter that operates.

Additionally, in the flicker reducing section 118, the normalization block 125 normalizes the difference value Fn (y)−Fn__1 (y) from the difference computing block 124 as it divides the difference value by the average value AVE [Fn (y)] from the average value computing block 123 to computationally determine the normalized difference value gn (y).

The normalized difference value gn (y) is expressed by the above-described formula (11).

Since the influence of the signal intensity of the subject remains on the difference value Fn (y)–Fn_1 (y), the level of the luminance change and that of the color change due to flickering can vary depending on the area in the image. However, the level of the luminance change and that of the color change can be equalized over all the areas of the image as a result of the above-described normalization.

Note that |Am| and θm that are expressed respectively by the above formulas (12) and (13) are the amplitude and the initial phase of the spectrum of each degree of the normalized difference value gn (y). Thus, by means of the above-described formulas (14) and (15), it is possible to determine the amplitude γm and the initial phase Φmn of the flicker component of each degree shown in the above-described formula (2) when the normalized difference value gn (y) is Fourier transformed and the amplitude |Am| and the initial phase θm of the spectrum of each degree are detected.

In the instance of the flicker reducing section 118 shown in FIG. 8, DFT block 140 performs a discrete Fourier transform of the data that corresponds to the wavelength (for line L) of the flicker in the normalized difference value gn (y) obtained from the normalization block 125.

If the DFT operation is DFT [gn (y)] and the result of the DFT of degree m is Gn (m), the DFT operation is expressed by the above-described formula (16).

Thus, it is possible to determine the amplitude γm and the initial phase Φmn of the flicker component of each degree by means of the above-described formulas (20) and (21).

The data length of the DFT operation is made equal to the wavelength of the flicker (for line L) because, by doing so, it is made possible to directly obtain a group of discrete spectra of integer times of ωo.

Generally, FFT (fast Fourier transform) is used for a Fourier transform when processing a digital signal. Nevertheless, however, DFT is used in this embodiment of the present invention. The reason for this is that DFT is more convenient than FFT because the data length of the Fourier transform is not equal to a power-of-two. However, it is also possible to use FFT by processing the input/output data.

Under the lighting of a fluorescent lamp, it is actually possible to satisfactorily approximate the flicker component if the range of the degree m is limited to be less than the tenth. Therefore, since it is not necessary to output all the data of the DFT operation, the use of DFT is not disadvantageous for the purpose of the present invention if compared with the use of FFT in terms of efficiency of operation.

The DFT block 40 firstly extracts spectra with a DFT operation defined by the above-described formula (16) and subsequently the amplitude γm and the initial phase Φmn of the flicker component of each degree are estimated by means of operations using the above-described formulas (21) and (22).

In the flicker reducing section 118 of FIG. 8, the flicker generation block 141 computationally determines the flicker coefficient Γn (y) expressed by the above-described formula (2) from the estimated values of γm and Φmn obtained from the DFT block 140.

However, as pointed out above, under the lighting of a fluorescent lamp, it is actually possible to satisfactorily approximate the flicker component if the range of the degree m is limited to be less than the tenth. Therefore, when computationally determining the flicker coefficient Γn (y) by means of the above-described formula (2), it is possible to limit the degree of summation to a predetermined number, for example to the second order so as not to make it infinite.

From the above-described formula (1), the signal component In (x, y) that does not contain any flicker component is expressed by the above-described formula (22).

Thus, in the flicker reducing section 118 of FIG. 8, arithmetic operation block 130 adds one to the flicker coefficient Γn (y) obtained from the flicker generation block 141 and divides the input video signal In' (x, y) by the sum [1+Γn (y)].

Then, as a result, the flicker component that is contained in the input video signal In' (x, y) is substantially completely eliminated and a signal component In (x, y) that practically does not contain any flicker component is obtained as output video signal (RGB primary color signal or luminance signal with a reduced flicker) from the arithmetic operation block 130.

Thus, the system controller 114 of the image pickup apparatus 110 receives the amplitude γm and the initial phase Φmn of the flicker component from the DFT block 140 of the above-described flicker reducing section 118 as inputs and is provided with a parameter control section 14\*, to which the integral value Y(n) and the integral value Y(n−k) of the flicker detecting area of the K preceding field from the luminance detecting section 119 are supplied.

The parameter control section 14\* may typically be a parameter control section 14A having a configuration as shown in FIG. 4 and executes a gain computation process for each DFT degree, following the sequence illustrated in the flowchart of FIG. 6 so as to output the suppressed gain of the amplitude γm of the flicker component from the total integral value Y(n) of the current flicker detecting area and the total integral value Y(n−k) of the flicker detecting area of the K preceding field.

Figure 9:
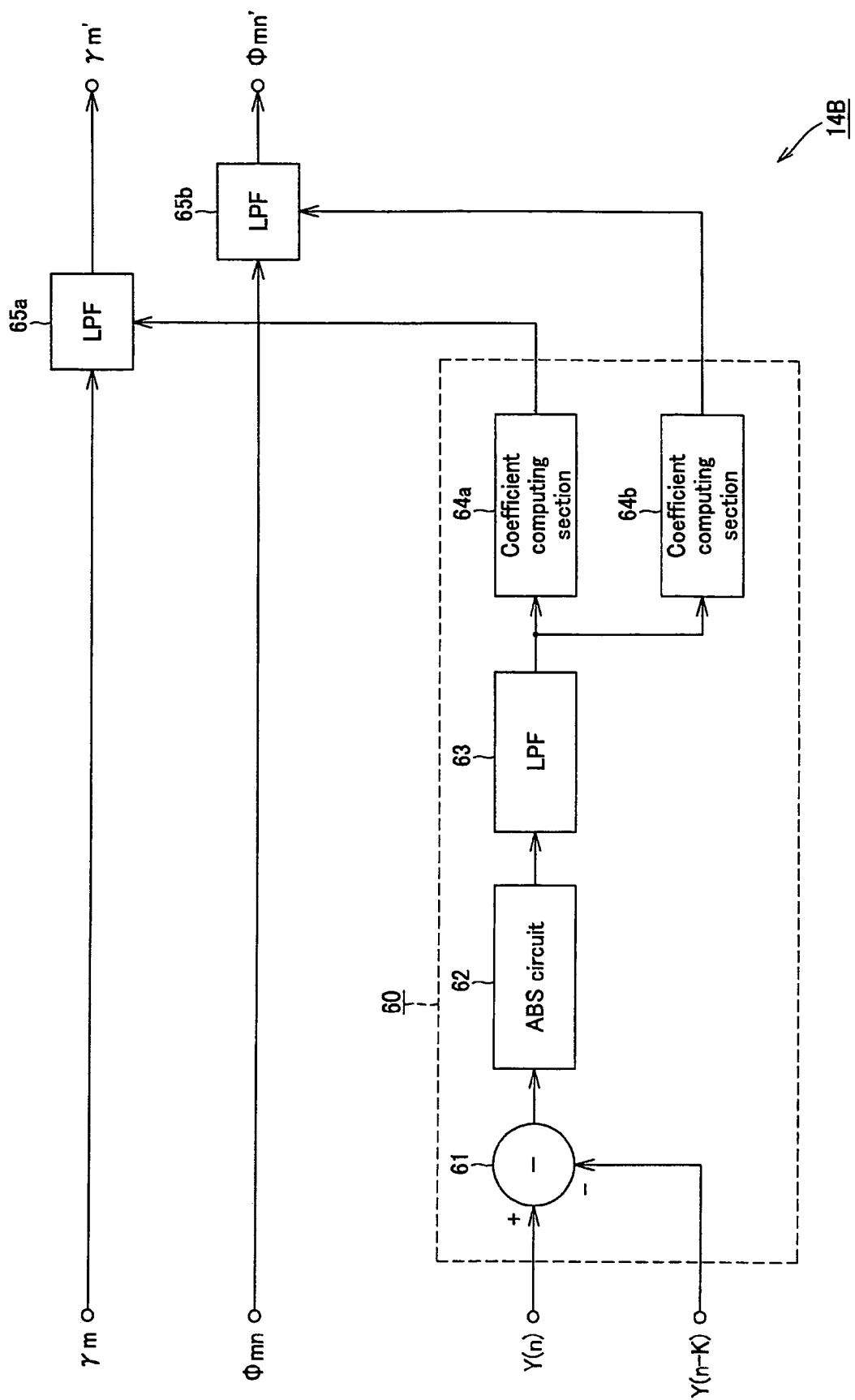
FIG. 9 is a schematic block diagram of another parameter control section arranged in the system controller of the image pickup apparatus of FIGS. 1 and 7.

The parameter control section 14\* arranged in the system controller 14 of the above-described image pickup apparatus 10 or the system controller 114 of the above-described image pickup apparatus 100 may not be a parameter control section 14A having a configuration as shown in FIG. 4 and may alternatively be a parameter control section 14B having a configuration as shown in FIG. 9.

The parameter control section 14B of FIG. 9 has a filter coefficient computing section 60 and two low pass filters (LPFs) 65a, 65b whose filter characteristics are variable.

In the parameter control section 14B, the amplitude γm and the initial phase Φmn of the flicker component of each degree as determined by the above-described DFT block 40 or the DFT block 140 are input to the two LPFs 65a, 65b and the total integral value Y(n) of the current flicker detecting area and the total integral value Y(n −k) of the flicker detecting area of the K preceding field are input to the above-described flicker coefficient computing section 60.

The flicker coefficient computing section 60 includes a subtracter 61, to which the integral value Y (n) of the current flicker detecting area and the integral value Y(n −k) of the flicker detecting area of the K preceding field are supplied, an absolute value (ABS) circuit 62 connected to the subtracter 61, a low pass filter (LPF) 63 connected to the ABS circuit 62, and two coefficient computing sections 64a, 64b connected to the LPF 63.

In the filter coefficient computing section 60, the subtracter 61 computationally determines the difference integral value ΔY(n) of the current integral value Y(n) and the integral value Y(n−K) of the K preceding field.

The ABS circuit 62 turns the output value of the subtracter 61 into the corresponding absolute value. When the output value of the subtracter 61 is small, it is possible to presume that there is no moving subject and the amplitude γm and the initial phase Φmn are regarded to be highly reliable. If, on the other hand, the output value of the subtracter 61 is large, the amplitude γm and the initial phase Φmn are regarded to be lowly reliable because it is possible to presume that there is a moving subject.

The LPF 63 is a filter for reducing any excessive fluctuations of the difference integral value |ΔY(n)| output from the ABS circuit 62 that arise due to external turbulences. The LPF is preferably arranged with a time constant that provides a time period good for stably determining if the scene to be shot is under the lighting of a fluorescent lamp or under the lighting of non-fluorescent lamp and prevents the LPF from reacting to external turbulences too sensitively.

Figure 10:
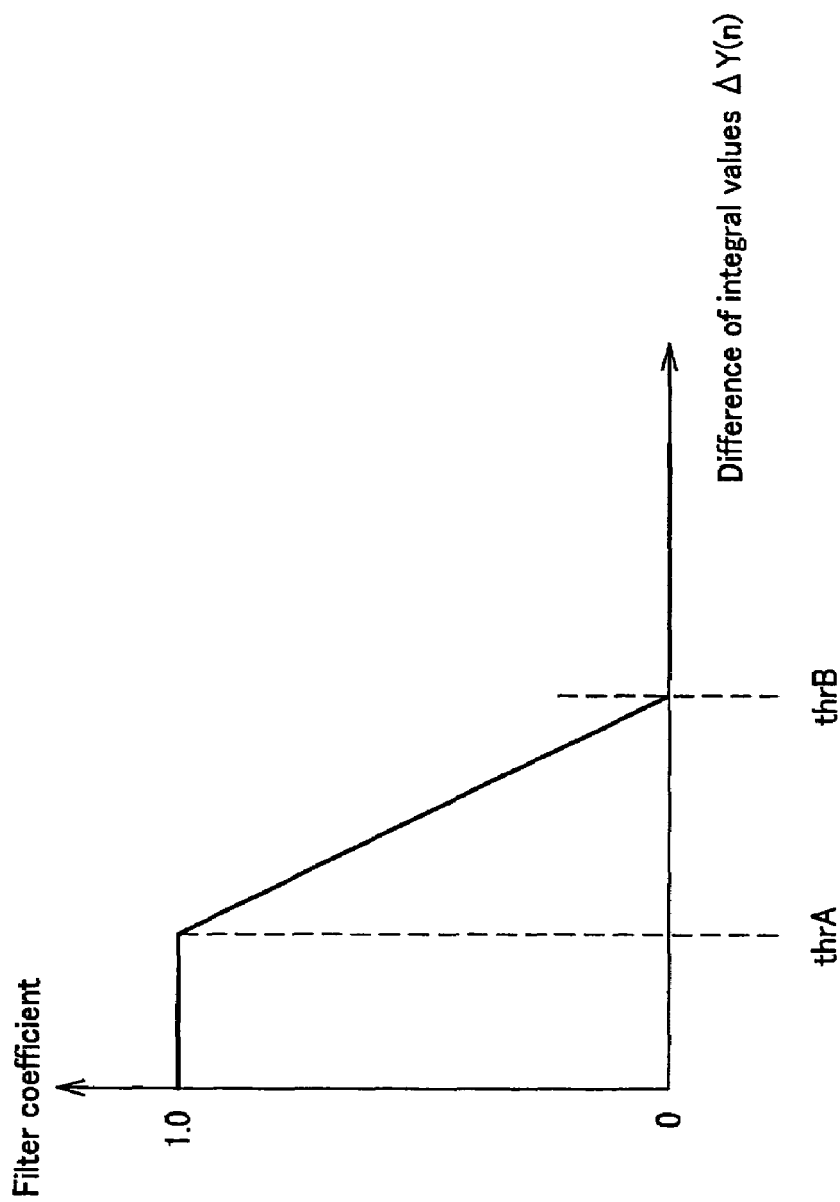
FIG. 10 is a graph of the function of the coefficient computing section of the parameter control section of FIG. 9.

The coefficient computing sections 64a, 64b output a value between 0 and 1 according to the output value of the LPF 63 as shown in FIG. 10. More specifically, they output 0 when the output value of the LPF 63 is greater than a threshold value thrB, whereas they output 1 when the output value of the LPF 63 is smaller than a threshold value thrA but they output a linearly interpolated value when the output value of the LPF 63 is between the threshold value thrA and the threshold value thrB. In short, they output 1 when the reliability of the output of the LPF 63 is highest but 0 when the reliability is lowest.

The LPF 65a executes an LPF process on the phase Φmn of the flicker component of each degree by means of the filter coefficient indicated by the coefficient computing section 64a.

The LPF 65b executes an LPF process on the amplitude γm of the flicker component of each degree by means of the filter coefficient indicated by the coefficient computing section 64b.

Figure 11:
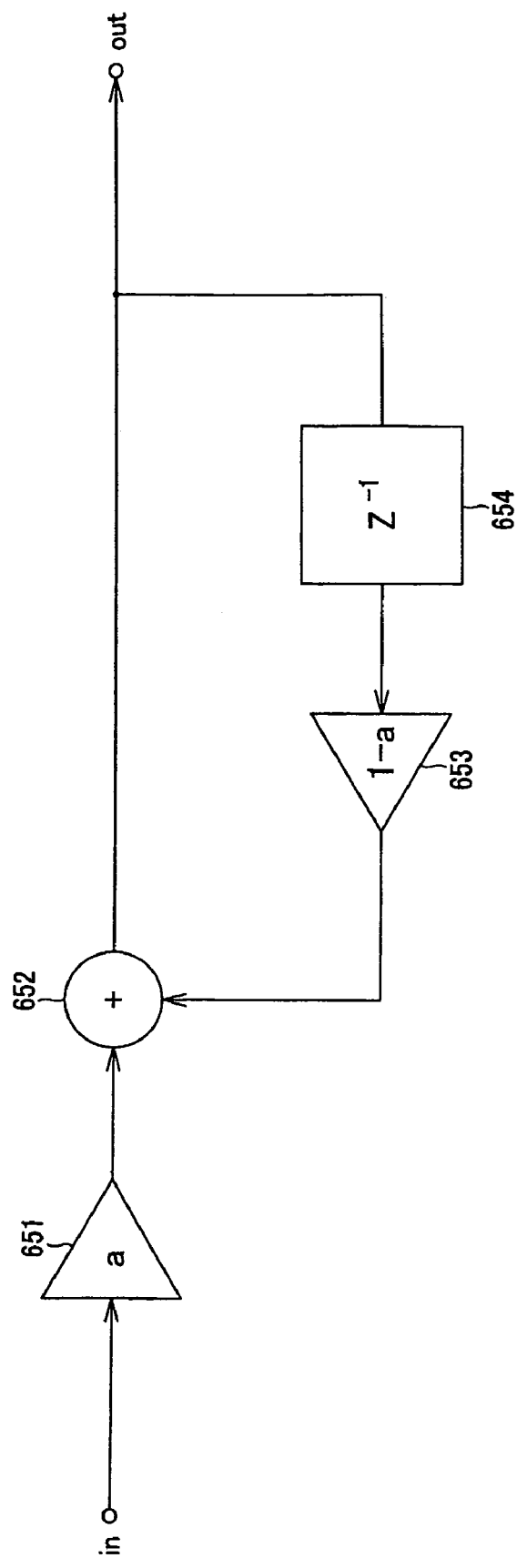
FIG. 11 is a schematic block diagram of the LPF arranged in the parameter control section of FIG. 9.

As shown in FIG. 11, each of the LPFs 65a, 65b has a weighting circuit 651 for weighting with weight a, an adder 652, a delay circuit 653 for producing a delay quantity of $Z^{-1}$ and a weighting circuit 654 with weight 1-a. The current detection value is heavily weighted when the coefficient a is large, whereas the current detection value is lightly weighted and the past detection value is heavily weighted when the coefficient a is small. With this arrangement, it is possible to make a right correction and eliminate correction errors by using a past detection value if a moving subject comes into the scene.

The coefficient computing process is executed for each degree of DFT. Basically, the first degree of DFT is the main component. However, it is desirable to computationally determine the gain for higher degrees in a situation where the components of higher degrees arise particularly when a high speed shutter is used. Additionally, there arises no problem if the coefficient is computationally determined constantly for higher degrees because any spectrum other than that of a fluorescent lamp is shifted far from the phase component of a fluorescent lamp and the gain is suppressed consequently.

A long time constant may be selected for the LPF 65a for the phase regardless of Y(n) and only the LPF 65b may be made variable as a function of Y(n) to reduce correction errors due to the subject. However, a slow following performance may take place in a transient situation from the presence of lighting of a non-inverter fluorescent lamp to the absence of lighting of a non-inverter fluorescent lamp and vice versa.

Figure 12:
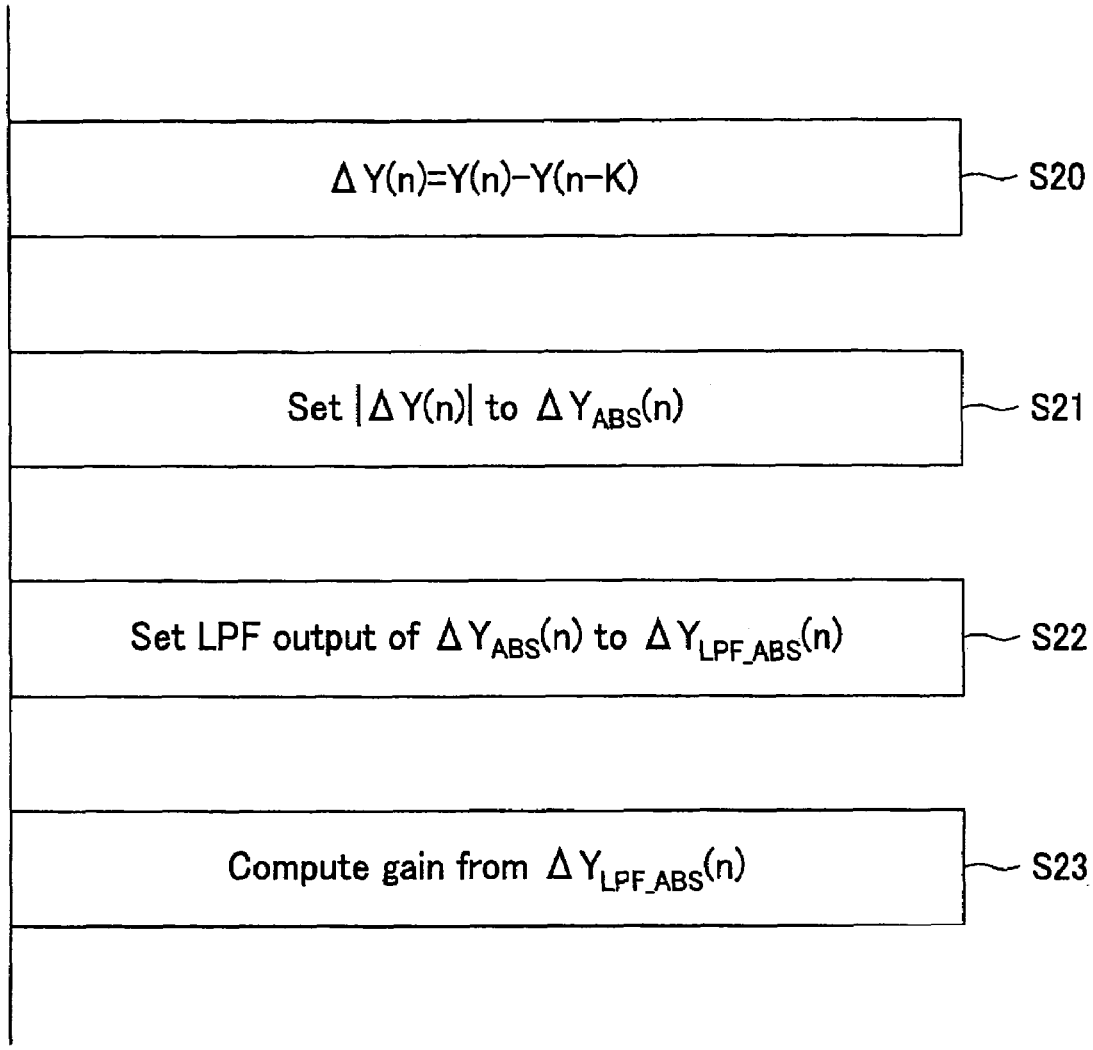
FIG. 12 is a flowchart of the sequence of control operation of the parameter control section of FIG. 9.

FIG. 12 is a flowchart of the sequence of control operation of the parameter control section.

Referring to FIG. 12, in the first step, or Step S20, the difference between the current integral value Y(n) and the integral value Y(n−K) of the K preceding field is set to difference integral value ΔY(n).

In the next step, or Step S21, the absolute value of the different integral value ΔY(n) is set to $ΔY_{ABS}(n)$.

In Step S22, the value obtained by applying an LPF process to $ΔY_{ABS}(n)$ is set to $ΔY_{LPF\_ABS}(n)$.

In Step S23, the filter coefficient is computationally determined by means of the function shown in FIG. 10 from $ΔY_{LPF\_ABS}(n)$. The function shown in FIG. 10 retains threshold values respectively for the amplitude and the phase and the computation for determining the filter coefficient is conducted for the amplitude and also for the phase.

Figure 13:
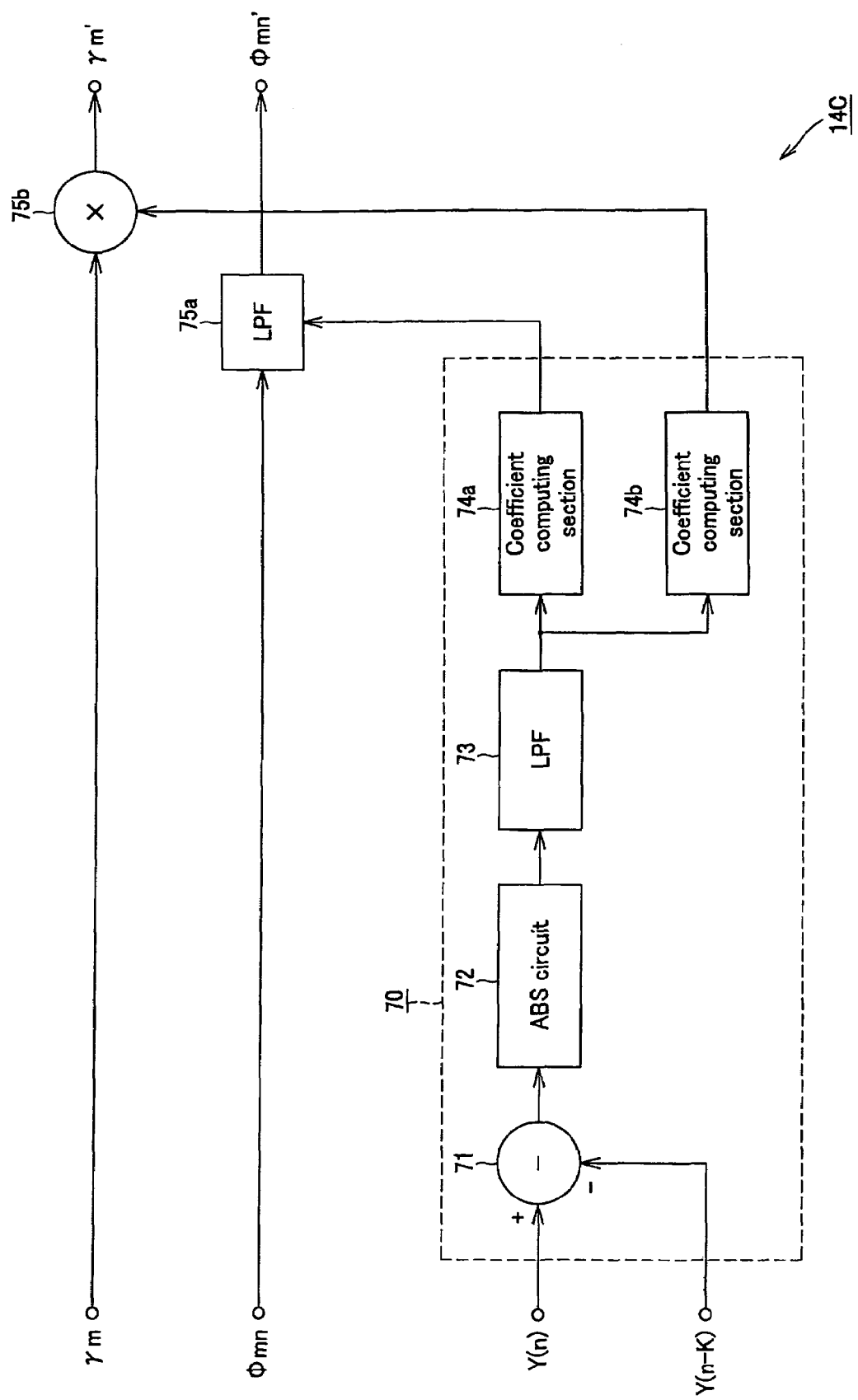
FIG. 13 is a schematic block diagram of an alternative parameter control section that can be arranged in the system controller of the image pickup apparatus of FIGS. 1 and 7.

The parameter control section 14* arranged in the system controller 14 of the above-described image pickup apparatus 10 or the system controller 114 of the above-described image pickup apparatus 100 may alternatively be a parameter control section 14C having a configuration as shown in FIG. 13.

The parameter control section 14C of FIG. 13 has a computing section 70, a low pass filter (LPF) 75a whose filter characteristics are variable, and a multiplier 75b.

In the parameter control section 14C, the amplitude γm and the initial phase Φmn of the flicker component of each degree as determined by the above-described DFT block 40 or the DFT block 140 are input to the LPF 75a and the multiplier 75b, while the total integral value Y(n) of the current flicker detecting area and the total integral value Y(n−k) of the flicker detecting area of the K preceding field are input to the above-described computing section 70 from the normalization process block 20 or the luminance detecting section 119 described earlier.

The computing section 70 is adapted to output the LPF coefficient of the amplitude γm of the flicker component from the total integral value Y(n) of the current flicker detecting area and the total integral value Y(n−k) of the flicker detecting area of the K preceding field. The computing section 70 includes a subtracter 71, to which the total integral value Y(n) of the current flicker detecting area and the total integral value Y(n−k) of the flicker detecting area of the K preceding field are supplied, an absolute value (ABS) circuit 72 connected to the subtracter 71, a low pass filter (LPF) 73 connected to the ABS circuit 72, and a coefficient computing section 74a and a gain computing section 74b connected to the LPF 73.

In the computing section 70, the subtracter 71 computationally determines the difference integral value ΔY(n) between the current integral value Y(n) of the current flicker detecting area and the integral value Y(n−K) of the flicker detecting area of the K preceding field.

The ABS circuit 72 turns the output value of the subtracter 71 into the corresponding absolute value. When the output value of the subtracter 71 is small, it is possible to presume that there is no moving subject. The amplitude γm and the initial phase Φmn are regarded to be highly reliable, therefore. If, on the other hand, the output value of the subtracter 71 is large, the amplitude γm and the initial phase Φmn are regarded to be lowly reliable because it is possible to presume that there is a moving subject.

The LPF 73 is a filter for reducing any excessive fluctuations of the difference integral value |ΔY(n)| output from the ABS circuit 72 that arise due to external turbulences. The LPF is preferably arranged with a time constant that provides a time period good for stably determining if the scene to be shot is under the lighting of a fluorescent lamp or under the lighting of non-fluorescent lamp and prevents the LPF from reacting to external turbulences too sensitively.

The coefficient computing sections 74a outputs a value between 0 and 1 according to the output value of the LPF 73 as shown in FIG. 10. More specifically, it outputs 0 when the output value of the LPF 73 is greater than a threshold value thrB, whereas it outputs 1 when the output value of the LPF 73 is smaller than a threshold value thrA but it outputs a linearly interpolated value when the output value of the LPF 73 is between the threshold value thrA and the threshold value thrB. In short, it outputs 1 when the reliability of the output of the LPF 73 is highest but 0 when the reliability is lowest.

The gain computing sections 74b outputs a value between 0 and 1 according to the output value of the LPF 73 as shown in FIG. 10. More specifically, it outputs 0 when the output value of the LPF 73 is greater than a threshold value thrB, whereas it outputs 1 when the output value of the LPF 73 is smaller than a threshold value thrA but it outputs a linearly interpolated value when the output value of the LPF 73 is between the threshold value thrA and the threshold value thrB. In short, it outputs 1 when the reliability of the output of the LPF 73 is high but 0 when the reliability is low.

The LPF 75a executes an LPF process on the phase Φmn of the flicker component of each degree by means of the filter coefficient indicated by the coefficient computing section 74a.

The multiplier 75b multiplies the amplitude γm of the flicker component of each degree with the output value of the gain computing section 74b.

The LPFs 75a has a configuration as illustrated in the above-described FIG. 11. The current detection value is heavily weighted when the coefficient a is large, whereas, when the coefficient a is small, the current detection value is lightly weighted and the past detection value is heavily weighted. With this arrangement, it is possible to make a right correction and eliminate correction errors by using a past detection value if a moving subject comes into the scene.

The coefficient computing process is executed for each degree of DFT. Basically, the first degree of DFT is the main component. However, it is desirable to computationally determine the gain for higher degrees in a situation where the components of higher degrees arise particularly when a high speed shutter is used. Additionally, there arises no problem if the coefficient is computationally determined constantly for higher degrees, because any spectrum other than that of a fluorescent lamp is shifted far from the phase component of a fluorescent lamp and the gain is suppressed consequently.

A long time constant may be selected for the LPF 75a for the phase regardless of Y(n) and only the multiplier 75b may be made variable as a function of Y(n) to reduce correction errors due to the subject. However, a slow following performance may take place in a transient situation from the presence of lighting of a non-inverter fluorescent lamp to the absence of lighting of a non-inverter fluorescent lamp and vice versa.

Figure 14:
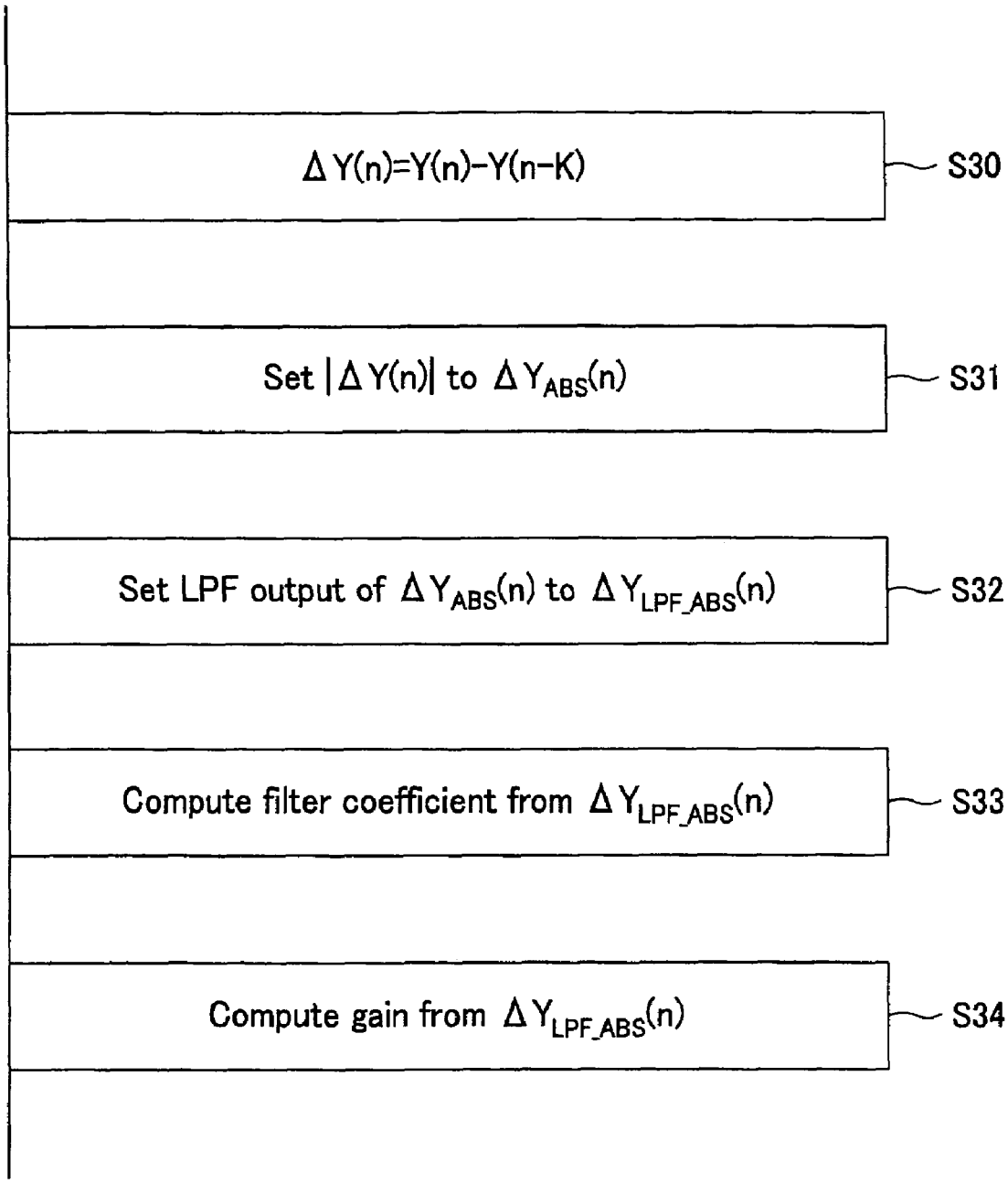
FIG. 14 is a flowchart of the sequence of control operation of the parameter control section of FIG. 13.

FIG. 14 is a flowchart of the sequence of control operation of the parameter control section.

Referring to FIG. 14, in the first step, or Step S30, the difference between the current integral value Y(n) and the integral value Y(n−K) of the K preceding field is set to difference integral value ΔY(n).

In the next step, or Step S31, the absolute value of the different integral value ΔY(n) is set to $\Delta Y_{ABS}(n)$.

In Step S32, the value obtained by applying an LPF process to $\Delta Y_{ABS}(n)$ is set to $\Delta Y_{LPF\_ABS}(n)$.

In Step S33, the filter coefficient is computationally determined by means of the function shown in FIG. 10 from $\Delta Y_{LPF\_ABS}(n)$.

In Step S34, the suppressed gain is computationally determined by means of the function shown in FIG. 5 from $\Delta Y_{LPF\_ABS}(n)$.

Figure 15:
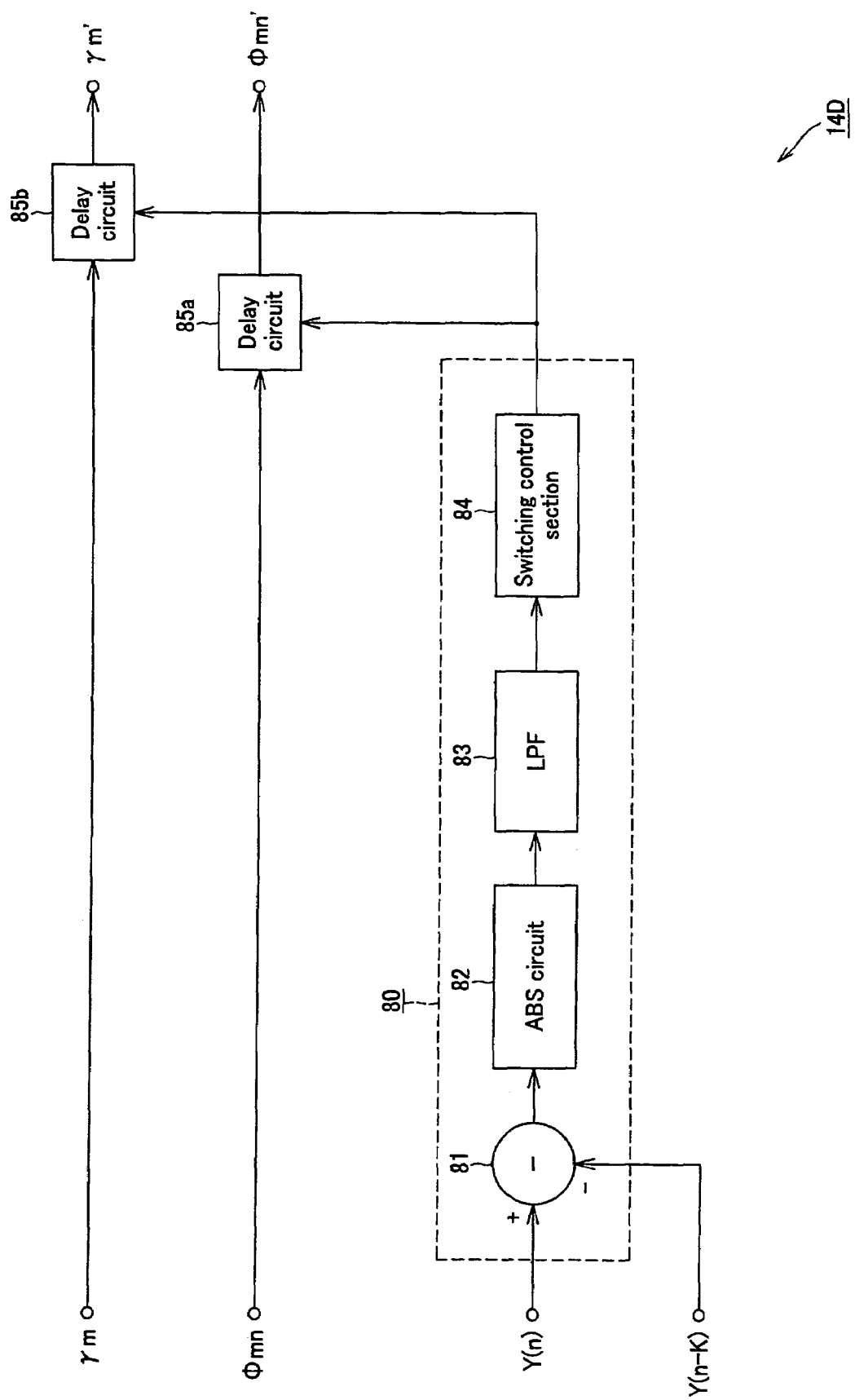
FIG. 15 is a schematic block diagram of another alternative parameter control section that can be arranged in the system controller of the image pickup apparatus of FIGS1 and. 7.

The parameter control section 14* arranged in the system controller 14 of the above-described image pickup apparatus 10 or the system controller 114 of the above-described image pickup apparatus 100 may alternatively be a parameter control section 14D having a configuration as shown in FIG. 15.

The parameter control section 14D of FIG. 15 has a delay quantity switching section 80 and two delay circuits 85a, 85b, each having a delay quantity that can be freely switched.

In the parameter control section 14D, the amplitude γm and the initial phase Φmn of the flicker component of each degree as determined by the above-described DFT block 40 or the DFT block 140 are input to the LPF 75a and the multiplier 75b, and the total integral value Y(n) between the current flicker detecting area and the total integral value Y(n−k) of the flicker detecting area of the K preceding field are input to the above-described delay quantity switching section 80.

The delay quantity switching section 80 controls the operation of the delay quantity of the amplitude γm and that of the initial phase Φmn of the flicker component from the current integral value Y(n) and the integral value of the K preceding field. The delay quantity switching section 80 includes a subtracter 81, to which the integral value Y (n) of the current flicker detecting area and the integral value Y(n−k) of the flicker detecting area of the K preceding field are supplied, an absolute value (ABS) circuit 82 connected to the subtracter 81, a low pass filter (LPF) 83 connected to the ABS circuit 82, and a switching control section 84 connected to the LPF 83.

In the delay quantity switching section 80, the subtracter 81 computationally determines the difference integral value ΔY(n) between the current integral value Y(n) and the integral value Y(n−K) of the K preceding field.

The ABS circuit 82 turns the output value of the subtracter 81 into the corresponding absolute value. When the output value of the subtracter 81 is small, it is possible to presume that there is no moving subject. The amplitude γm and the initial phase Φmn are regarded to be highly reliable, therefore. If, on the other hand, the output value of the subtracter 81 is large, the amplitude γm and the initial phase Φmn are regarded to be lowly reliable because it is possible to presume that there is a moving subject.

The LPF 83 is a filter for reducing any excessive fluctuations of the difference integral value |ΔY(n)| output from the ABS circuit 82 that arise due to external turbulences. The LPF is preferably arranged with a time constant that provides a time period good for stably determining if the scene to be shot is under the lighting of a fluorescent lamp or under the lighting of non-fluorescent lamp and prevents the LPF from reacting to external turbulences too sensitively.

Figure 16:
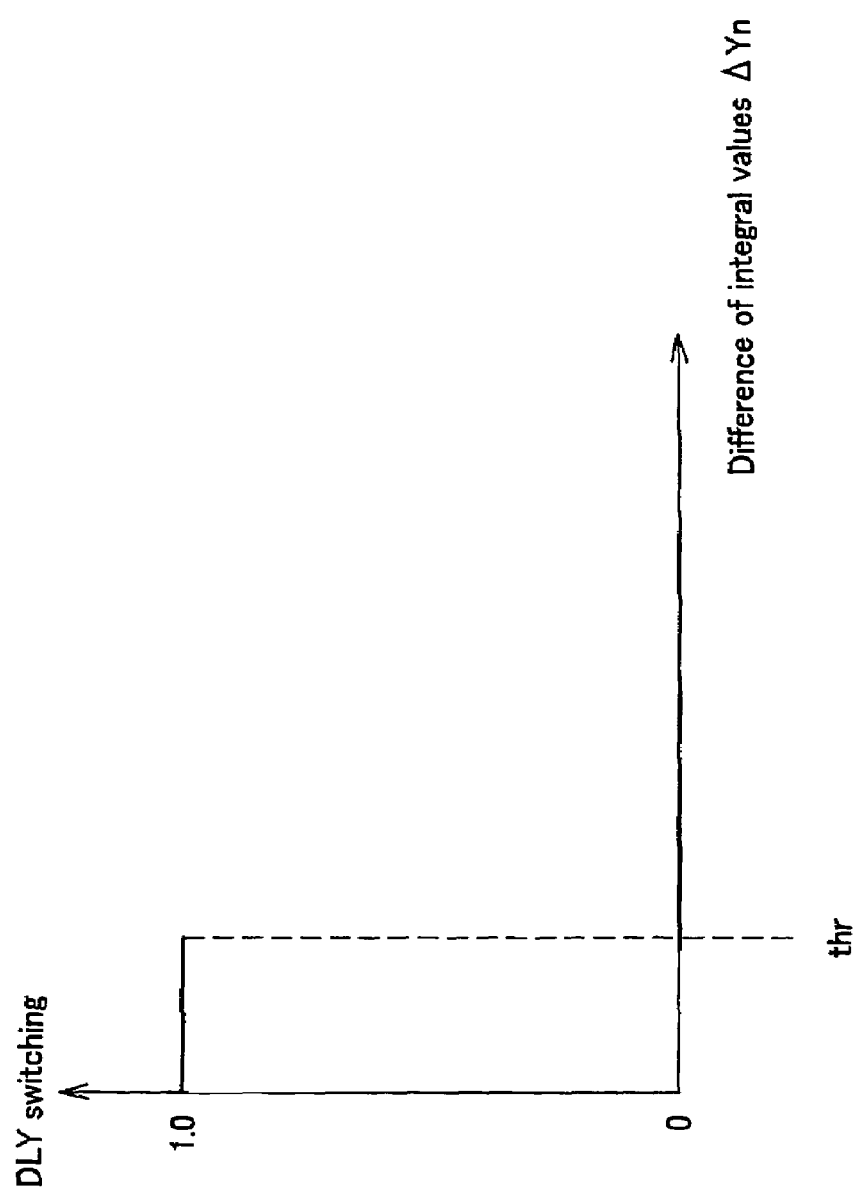
FIG. 16 is a graph of the function of the switching control section arranged in the parameter control section of FIG. 15.

The switching control section 84 outputs a value equal to 0 or a value equal to 1 according to the output value of the LPF 83 as shown in FIG. 16. More specifically, it outputs 0 when the output value of the LPF 83 is greater than a threshold value thr, whereas it outputs 1 when the output value of the LPF 83 is smaller than the threshold value thr. In short, it outputs 1 when the reliability of the output of the LPF 83 is high and 0 when the reliability of the output of the LPF 83 is low.

The delay circuit 85a sets the value indicated by the switching control section 84 for the amplitude γm for the flicker component of each degree in the delay circuit 85b.

The delay circuit 85b sets the value indicated by the switching control section 84 for the phase Φmn for the flicker component of each degree in the delay circuit 85b.

Figure 17:
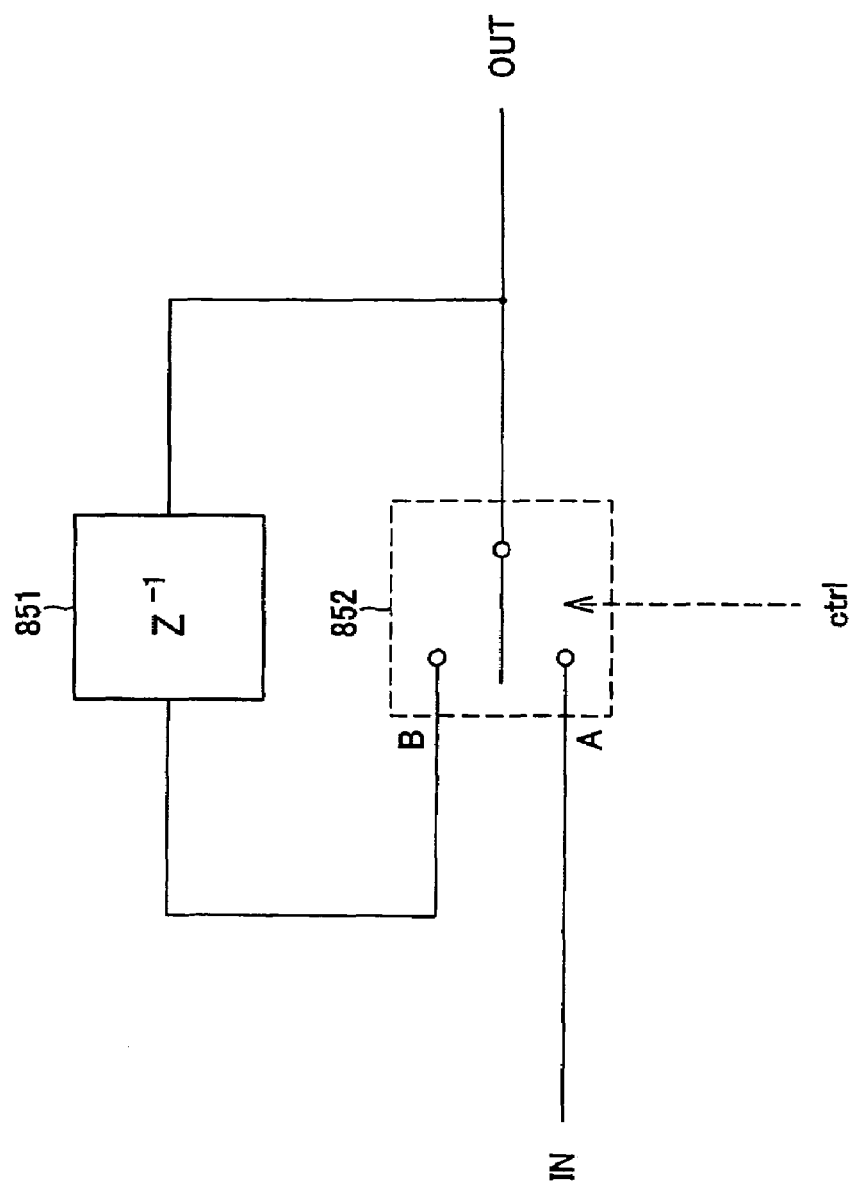
FIG. 17 is a schematic block diagram of the delay circuit arranged in the parameter control section of FIG. 15.

As shown in FIG. 17, each of the delay circuits 85a, 85b has a delay element 851 with a delay quantity of $Z^{-k}$ and a changeover switch 852. The changeover switch 852 selects signal A when the switching control signal ctrl is 1, whereas it selects signal B when the switching control signal ctrl is 0. In short, it selects the current signal A when the reliability is high but selects the signal of the K preceding field to use the detection value of the past that is reliable.

The coefficient computing process is executed for each degree of DFT. Basically, the first degree of DFT is the main component. However, it is desirable to computationally determine the gain for higher degrees in a situation where the components of higher degrees arise particularly when a high speed shutter is used. Additionally, there arises no problem if the coefficient is computationally determined constantly for higher degrees, because any spectrum other than that of a fluorescent lamp is shifted far from the phase component of a fluorescent lamp and the gain is suppressed consequently.

Figure 18:
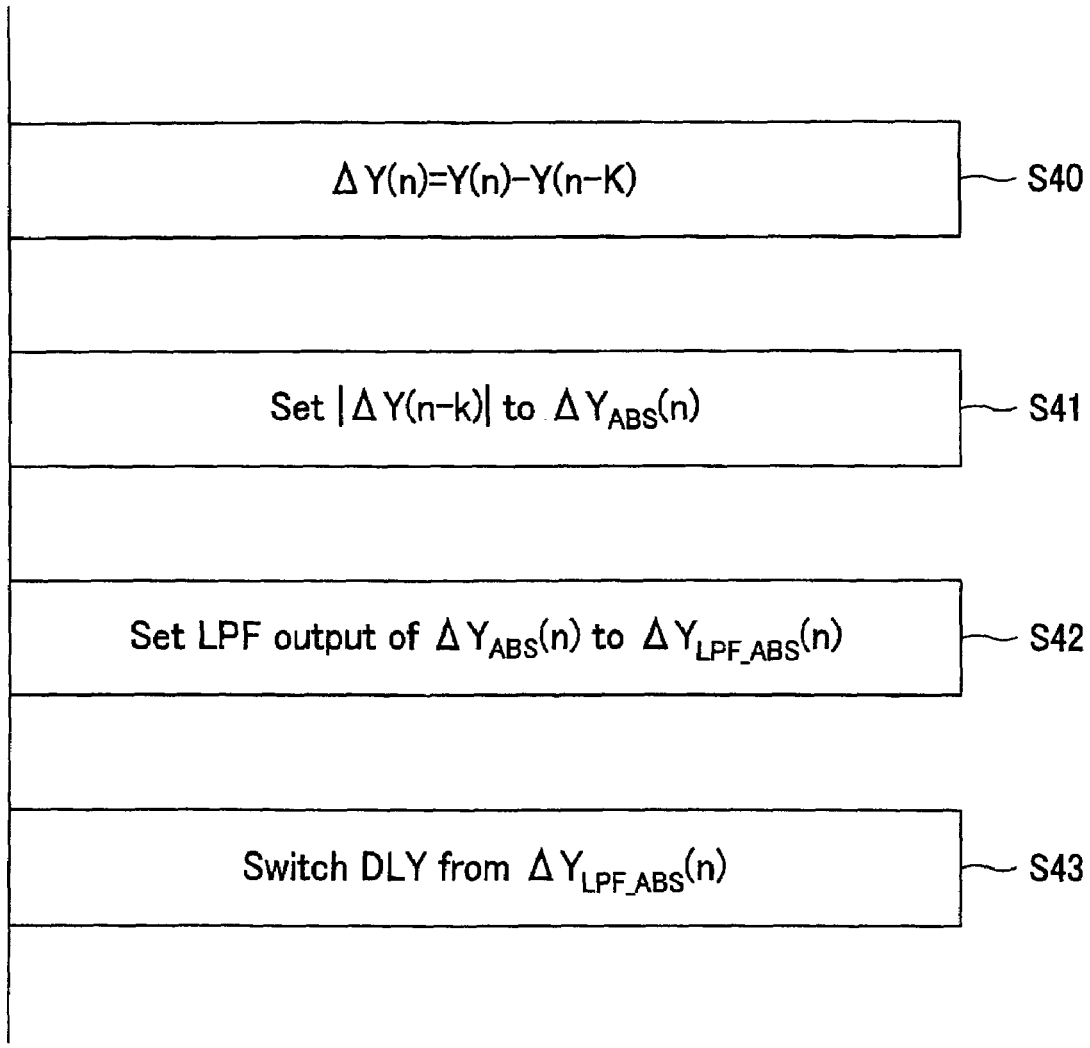
FIG. 18 is a flowchart of the sequence of control operation of the parameter control section of FIG. 15.

FIG. 18 is a flowchart of the sequence of control operation of the parameter control section.

Referring to FIG. 18, in the first step, or Step S40, the difference between the current integral value Y(n) and the integral value Y(n−K) of the K preceding field is set to difference integral value ΔY(n).

In the next step, or Step S41, the absolute value of the different integral value ΔY(n) is set to $\Delta Y_{ABS}(n)$.

In Step S42, the value obtained by applying an LPF process to $\Delta Y_{ABS}(n)$ is set to $\Delta Y_{LPF\_ABS}(n)$.

In Step S43, the delay quantity of the delay circuit 85a and that of the delay circuit 85b are switched according to the function shown in FIG. 16 on the basis of $\Delta Y_{LPF\_ABS}(n)$.

It should be understood by those skilled in the art that various modifications, combinations, sub-combinations and alterations may occur depending on design requirements and other factors insofar as they are within the scope of the appended claims or the equivalents thereof.

What is claimed is:

1. A flicker-reduction method for reducing a flicker component of a fluorescent lamp, the method comprising:
   a capturing step of capturing an input video signal from light passing through a lens of a camera onto an imaging element of the camera, the input video signal being of a subject under lighting of the fluorescent lamp; and
   performing, by a digital signal processor of the camera:
      an integration step of integrating the input video signal of the subject, shot over a time period greater than a horizontal period;
      a normalization step of normalizing an integral value obtained in the integration step or the difference value between integral values of adjacent fields or frames;
      an extraction step of extracting the spectrum of the integral value or the difference value normalized in the normalization step;
      an estimation step of estimating the flicker component from the spectrum extracted in the extraction step;
      a subtraction step of acquiring the current integral value obtained by integrating the input video signal over a time period greater than a horizontal period and the integral value of a field preceding the current field by several fields and determining the difference of the integral values;
      a computation step of computing the probability of being under the lighting of a fluorescent lamp from the difference of the integral values determined in the subtraction step;
      a flicker-reduction signal generation step of generating a flicker-reduction signal for canceling the flicker component estimated in the estimation step according to the probability of being under the lighting of a fluorescent lamp as computed from the difference of the integral values; and
      an arithmetic operation step of subjecting the flicker-reduction signal generated in the flicker-reduction signal generation step and the input video signal to an arithmetic operation.

2. The method according to claim 1, wherein
an amplitude component and a phase component of the flicker component are computationally determined in the estimation step from the spectrum extracted in the extraction step, and
the flicker-reduction signal generation step comprises:
a suppression coefficient computing step of computationally determining a suppression coefficient from the probability of being under the lighting of a fluorescent lamp as computationally determined from the difference of the integral values; and
a multiplication step of multiplying the suppression coefficient as computationally determined in the suppression coefficient computing step with the amplitude component as computationally determined in the estimation step.

3. The method according to claim 1, wherein
the amplitude component and the phase component of the flicker component are computationally determined in the estimation step from the spectrum extracted in the extraction step, and
the flicker-reduction signal generation step comprises:
a filter coefficient computing step of computationally determining the filter coefficient from the probability of being under the lighting of a fluorescent lamp as computed from the difference of the integral values; and
an application step of applying the filter coefficient as computationally determined in the filter coefficient computing step to the amplitude component and the phase component as computationally determined in the estimation step.

4. The method according to claim 1, wherein
the amplitude component and the phase component of the flicker component are computationally determined in the estimation step from the spectrum extracted in the extraction step, and
the flicker-reduction signal generation step comprises:
a suppression coefficient computing step of computationally determining the suppression coefficient from the probability of being under the lighting of a fluorescent lamp as computationally determined from the difference of the integral values;
a filter coefficient computing step of computationally determining the filter coefficient from the probability of being under the lighting of a fluorescent lamp;
a multiplication step of multiplying the suppression coefficient as computed in the suppression coefficient computing step with the amplitude component as computationally determined in the estimation step; and
an application step of applying the filter coefficient as computationally determined in the filter coefficient computing step to the phase component as computationally determined in the estimation step.

5. The method according to claim 1, wherein
the amplitude component and the phase component of the flicker component are computationally determined in the estimation step from the spectrum extracted in the extraction step, and
the flicker-reduction signal generation step comprises:
a retention step of retaining data of the amplitude and the phase of the flicker component as computed in the estimation step;
a switching signal computing step of computationally determining the switching signal of selecting the amplitude and the phase at present or those in the past from the probability of being under the lighting of a fluorescent lamp; and a switching step of switching to the current data or the past data on the amplitude component and the phase component by means of the switching signal as computationally determined in the switching signal computing step.

6. A flicker-reduction circuit for reducing a flicker component of a fluorescent lamp contained in a video signal obtained by shooting a subject by means of an XY address scanning type imaging element under a lighting of a fluorescent lamp, the circuit comprising:

integration means for integrating the input video signal obtained by shooting the subject over a time period greater than a horizontal period;

normalization means for normalizing an integral value obtained by the integration means or the difference value between integral values obtained in adjacent fields or frames:

extraction means for extracting the spectrum of the integral value or the difference value normalized by the normalization means;

estimation means for estimating the flicker component from the spectrum extracted by the extraction means;

subtraction means for acquiring the current integral value obtained by integrating the input video signal over a time period greater than a horizontal period and the integral value of a field preceding the current field by several fields and determining the difference of the integral values;

computation means for computing the probability of being under the lighting of a fluorescent lamp from the difference of the integral values determined by the subtraction means;

flicker-reduction signal generation means for generating a flicker-reduction signal for canceling the flicker component estimated by the estimation means according to the probability of being under the lighting of a fluorescent lamp as computed from the difference of the integral values; and arithmetic operation means for subjecting the flicker-reduction signal generated by the flicker-reduction signal generation means and the input video signal to an arithmetic operation.

7. The circuit according to claim 6, wherein
the estimation means computationally determines an amplitude component and a phase component of the flicker component from the spectrum extracted by the extraction means, and
the flicker-reduction signal generation means comprises:
suppression coefficient computing means for computationally determining a suppression coefficient from the probability of being under the lighting of a fluorescent lamp as computationally determined from the difference of the integral values; and
multiplication means for multiplying the suppression coefficient as computationally determined by the suppression coefficient computing means with the amplitude component as computationally determined by the estimation means.

8. The circuit according to claim 6, wherein
the estimation means computationally determines the amplitude component and the phase component of the flicker component from the spectrum extracted by the extraction means, and
the flicker-reduction signal generation means comprises;
filter coefficient computing means for computationally determining the filter coefficient from the probability of being under the lighting of a fluorescent lamp as computed from the difference of the integral values; and filter means for applying the filter coefficient as computationally determined by the filter coefficient computing means to the amplitude component and the phase component as computationally determined by the estimation means.

9. The circuit according to claim 6, wherein
the estimation means computationally determines the amplitude component and the phase component of the flicker component from the spectrum extracted by the extraction means, and
the flicker-reduction signal generation means comprises:
suppression coefficient computing means for computationally determining the suppression coefficient from the probability of being under the lighting of a fluorescent lamp as computationally determined from the difference of the integral values;
filter coefficient computing means for computationally determining the filter coefficient from the probability of being under the lighting of a fluorescent lamp;
multiplication means for multiplying the suppression coefficient as computed by the suppression coefficient computing means with the amplitude component as computationally determined by the estimation means; and
filter means for applying the filter coefficient as computationally determined by the filter coefficient computing means to the phase component as computationally determined by the estimation means.

10. The circuit according to claim 6, wherein
the estimation means computationally determines the amplitude component and the phase component of the flicker component from the spectrum extracted by the extraction means, and
the flicker-reduction signal generation means comprises:
delay means for retaining data of the amplitude and the phase of the flicker component as computed by the estimation means;
switching signal computing means for computationally determining the switching signal of selecting the amplitude and the phase at present or those in the past from the probability of being under the lighting of a fluorescent lamp as computationally determined from the difference of the integral values; and
switching means for switching to the current data or the past data on the amplitude component and the phase component by means of the switching signal.

11. An image pickup apparatus having a flicker-reduction circuit for reducing a flicker component of a fluorescent lamp contained in a video signal obtained by shooting a subject by means of an XY address scanning type imaging element under a lighting of a fluorescent lamp, the circuit comprising:
integration means for integrating the input video signal obtained by shooting the subject over a time period greater than a horizontal period;
normalization means for normalizing an integral value obtained by the integration means or the difference value between integral values of adjacent fields or frames:
extraction means for extracting the spectrum of the integral value or the difference value normalized by the normalization means;
estimation means for estimating the flicker component from the spectrum extracted by the extraction means;
subtraction means for acquiring the current integral value obtained by integrating the input video signal over a time period greater than a horizontal period and the integral value of a field preceding the current field by several fields and determining the difference of the integral values;

computation means for computing the probability of being under the lighting of a fluorescent lamp from the difference of the integral values determined by the subtraction means;

flicker-reduction signal generation means for generating a flicker-reduction signal for canceling the flicker component estimated by the estimation means according to the probability of being under the lighting of a fluorescent lamp as computed from the difference of the integral values; and arithmetic operation means for subjecting the flicker-reduction signal generated by the flicker-reduction signal generation means and the input video signal to an arithmetic operation.

12. The apparatus according to claim 11, wherein the estimation means computationally determines an amplitude component and a phase component of the flicker component from the spectrum extracted by the extraction means, and the flicker-reduction signal generation means comprises:

suppression coefficient computing means for computationally determining a suppression coefficient from the probability of being under the lighting of a fluorescent lamp as computationally determined from the difference of the integral values; and multiplication means for multiplying the suppression coefficient as computationally determined by the suppression coefficient computing means with the amplitude component as computationally determined by the estimation means.

13. The apparatus according to claim 11, wherein the estimation means computationally determines an amplitude component and a phase component of the flicker component from the spectrum extracted by the extraction means, and the flicker-reduction signal generation means comprises:

filter coefficient computing means for computationally determining a filter coefficient from the probability of being under the lighting of a fluorescent lamp as computed from the difference of the integral values; and filter means for applying the filter coefficient as computationally determined by the filter coefficient computing means to the amplitude component and the phase component as computationally determined by the estimation means.

14. The apparatus according to claim 11, wherein the estimation means computationally determines the amplitude component and the phase component of the flicker component from the spectrum extracted by the extraction means, and the flicker-reduction signal generation means comprises:

suppression coefficient computing means for computationally determining the suppression coefficient from the probability of being under the lighting of a fluorescent lamp as computationally determined from the difference of the integral values;

filter coefficient computing means for computationally determining the filter coefficient from the probability of being under the lighting of a fluorescent lamp;

multiplication means for multiplying the suppression coefficient as computed by the suppression coefficient computing means with the amplitude component as computationally determined by the estimation means; and filter means for applying the filter coefficient as computationally determined by the filter coefficient computing means to the phase component as computationally determined by the estimation means.

15. The apparatus according to claim 11, wherein the estimation means computationally determines the amplitude component and the phase component of the flicker component from the spectrum extracted by the extraction means, and the flicker-reduction signal generation means comprises:

delay means for retaining data of the amplitude and the phase of the flicker component as computed by the estimation means;

switching signal computing means for computationally determining the switching signal of selecting the amplitude and the phase at present or those in the past from the probability of being under the lighting of a fluorescent lamp as computationally determined from the difference of the integral values; and switching means for switching to the current data or the past data on the amplitude component and the phase component by means of the switching signal.

16. A flicker-reduction circuit for reducing a flicker component of a fluorescent lamp contained in a video signal obtained by shooting a subject by means of an XY address scanning type imaging element under a lighting of a fluorescent lamp, the circuit comprising:

an integration unit configured to integrate the input video signal obtained by shooting the subject over a time period greater than a horizontal period;

a normalization unit configured to normalize an integral value obtained by the integration unit or the difference value between integral values of adjacent fields or frames:

an extraction unit configured to extract the spectrum of the integral value or the difference value normalized by the normalization unit;

an estimation unit configured to estimate the flicker component from the spectrum extracted by the extraction unit;

a subtraction unit configured to acquire the current integral value obtained by integrating the input video signal over a time period greater than a horizontal period and the integral value of a field preceding the current field by several fields and determines the difference of the integral values;

a computation unit configured to compute the probability of being under the lighting of a fluorescent lamp from the difference of the integral values determined by the subtraction unit;

a flicker-reduction signal generation unit configured to generate a flicker-reduction signal for canceling the flicker component estimated by the estimation unit according to the probability of being under the lighting of a fluorescent lamp as computed from the difference of the integral values; and an arithmetic operation unit configured to subject the flicker-reduction signal generated by the flicker-reduction signal generation unit and the input video signal to an arithmetic operation.

17. An image pickup apparatus having a flicker-reduction circuit for reducing a flicker component of a fluorescent lamp contained in a video signal obtained by shooting a subject by means of an XY address scanning type imaging element under a lighting of a fluorescent lamp, the circuit comprising:

an integration unit configured to integrate the input video signal obtained by shooting the subject over a time period greater than a horizontal period;

a normalization unit configured to normalize an integral value obtained by the integration unit or the difference value between integral values of adjacent fields or frames;

an extraction unit configured to extract the spectrum of the integral value or the difference value normalized by the normalization unit;

an estimation unit configured to estimate the flicker component from the spectrum extracted by the extraction unit;

a subtraction unit configured to acquire the current integral value obtained by integrating the input video signal over a time period greater than a horizontal period and the integral value of a field preceding the current field by several fields and determines the difference of the integral values;

a computation unit configured to compute the probability of being under the lighting of a fluorescent lamp from the difference of the integral values determined by the subtraction unit;

a flicker-reduction signal generation unit configured to generate a flicker-reduction signal for canceling the flicker component estimated by the estimation unit according to the probability of being under the lighting of a fluorescent lamp as computed from the difference of the integral values; and an arithmetic operation unit configured to subject the flicker-reduction signal generated by the flicker-reduction signal generation unit and the input video signal to an arithmetic operation.

* * * * *